US012774082B2

(12) United States Patent
Ehney

(10) Patent No.: US 12,774,082 B2
(45) Date of Patent: Oct. 27, 2026

(54) SNAP-ON SUPPORT ASSEMBLY AND METHOD

(71) Applicant: The Boeing Company, Arlington, VA (US)

(72) Inventor: Dennis W. Ehney, Hollywood, SC (US)

(73) Assignee: The Boeing Company, Arlington, VA (US)

( * ) Notice: Subject to any disclaimer, the term of this patent is extended or adjusted under 35 U.S.C. 154(b) by 116 days.

(21) Appl. No.: 18/792,401

(22) Filed: Aug. 1, 2024

(65) Prior Publication Data

US 2026/0035063 A1 Feb. 5, 2026

(51) Int. Cl.
*B64C 1/40* (2006.01)

(52) U.S. Cl.
CPC .................................... *B64C 1/406* (2013.01)

(58) Field of Classification Search
CPC ..................................................... B64C 1/406
USPC ........................................................... 248/65
See application file for complete search history.

(56) References Cited

U.S. PATENT DOCUMENTS 3,157,377 A 11/1964 Orenick
5,149,027 A 9/1992 Weber
5,189,766 A 3/1993 Weber
5,799,906 A 9/1998 Hillegonds
5,967,468 A 10/1999 Veghte et al.
6,443,403 B1 9/2002 Page et al.
6,729,585 B2 5/2004 Ogden
D497,100 S 10/2004 Stephen
6,880,787 B2 4/2005 Stephen et al.
6,880,788 B2 * 4/2005 Stephen .................. H02G 3/32 24/130
7,523,898 B1 4/2009 Barry
7,654,492 B2 2/2010 Balderama et al.
7,686,259 B2 3/2010 Caveney et al.
7,770,852 B2 * 8/2010 Caveney ................. H02G 3/32 411/401
8,403,272 B2 3/2013 Ohno
8,829,353 B2 * 9/2014 Homner .................. H02G 3/32 248/65
8,888,053 B2 * 11/2014 Blanchard .............. B64C 1/406 248/74.1
9,083,169 B2 * 7/2015 James .................. F16B 37/043
9,377,135 B2 * 6/2016 Karls ...................... F16L 3/127
9,470,252 B2 10/2016 Karls (Continued)

OTHER PUBLICATIONS

EPO, Extended European Search Report, appl. No. EP 25182736, issued on Nov. 18, 2025.

(Continued)

*Primary Examiner* — Anita M King

(57) ABSTRACT

A snap-on support assembly has a snap-on base and at least one ring post. The snap-on base includes a base bottom portion and a base top portion. The base bottom portion has a spaced-apart pair of bottom portion attachment arms configured for snap-on attachment to a bar member. The base top portion comprises a monument co-molded with the base bottom portion and having a monument top end having a monument threaded bore. The ring post has a ring for securing one or more elongate elements to the ring post. The ring post is configured to be attached to the monument top end via a threaded element engaging the monument threaded bore.

20 Claims, 21 Drawing Sheets

(56) References Cited

U.S. PATENT DOCUMENTS

| | | | |
|---|---|---|---|
| 9,689,511 | B1 * | 6/2017 | Thornton ................. H02G 3/30 |
| 10,096,934 | B1 * | 10/2018 | Desjardins ......... H01R 13/5841 |
| 10,907,679 | B2 | 2/2021 | Shehab |
| 11,906,089 | B2 | 2/2024 | Hargett et al. |
| 12,275,359 | B2 * | 4/2025 | Hargett ............... B60R 16/0215 |
| 2004/0037667 | A1 | 2/2004 | Stephen |
| 2005/0242245 | A1 | 11/2005 | Balderama et al. |
| 2005/0258314 | A1 | 11/2005 | Schilles et al. |
| 2006/0080933 | A1 | 4/2006 | Robicheau |
| 2009/0282655 | A1 | 11/2009 | James |
| 2010/0294896 | A1 | 11/2010 | Sayilgan |
| 2013/0189050 | A1 | 7/2013 | James |
| 2014/0014775 | A1 | 1/2014 | Luthi |
| 2018/0356007 | A1 | 12/2018 | Waters |
| 2019/0078606 | A1 | 3/2019 | Shehab |
| 2023/0400124 | A1 | 12/2023 | Hargett |

OTHER PUBLICATIONS

McMaster-Carr Strut Channel Framing and Fitting online product data page dated Jun. 12, 2020, https://www.mcmaster.com/strut-channel-systems/ (Year: 2020), 7 pages.

HellermannTyton, Engineered Fastening Solutions, Jul. 2011, Bundle separation products, Mounts, and Cable management product catalog, (Year: 2011), 152 pages.

* cited by examiner

SNAP-ON SUPPORT ASSEMBLY AND METHOD

FIELD

The present disclosure relates generally to systems and methods for supporting elongate elements, such as wire harnesses, on elongate bar members, such as spanner bars, which are mounted to a vehicle, such as an aircraft.

BACKGROUND

Large commercial aircraft typically contain a multitude of wire harnesses, cables, hoses, tubing, and other elongate elements that are routed to different locations throughout the aircraft. The elongate elements are typically supported at spaced intervals along the lengths of spanner bars, which are mounted to the internal structure of the aircraft.

One type of component for supporting elongate elements is a conventional co-molded ring post, which is comprised of one or more rings concentrically supported on a post via radially extending spokes. The process of attaching each co-molded ring post to a spanner bar is a manual process that involves passing a mechanical fastener through a hole in the co-molded ring post and a corresponding hole in the spanner bar, then securing a washer and nut on the portion of the fastener that protrudes from an underside of the spanner bar. This process is time consuming and labor intensive. During the manufacturing of a large commercial aircraft, thousands of ring posts must typically be installed, which increases overall production time.

In some locations along the length of a spanner bar, a co-molded ring post having only a single ring is needed to support an elongate element, while other locations require a co-molded ring post that has two or more rings spaced apart from each other for securing multiple elongate elements at that location on the spanner bar. To accommodate these different requirements, a plurality of different co-molded ring post configurations must be manufactured or purchased with varying numbers of rings. As may be appreciated, the need to manufacture or purchase multiple co-molded ring post configurations and keep large quantities of each configuration in stock increases the cost and complexity of a production program.

As can be seen, there exists a need in the art for a system and method for supporting different quantities of elongate elements at different locations along a spanner bar without requiring multiple configurations of co-molded ring posts. Preferably, the system and method reduces or avoids the need for mechanical fasteners.

SUMMARY

The above-noted needs associated with supporting elongate elements (e.g., wire harnesses, cables, tubing, etc.) at different locations along a spanner bar are addressed by the present disclosure, which provides a snap-on support assembly having a snap-on base and at least one ring post. The snap-on base includes a base bottom portion and a base top portion. The base bottom portion has a spaced-apart pair of bottom portion attachment arms configured for snap-on attachment to a bar member. The base top portion comprises a monument co-molded with the base bottom portion and having a monument top end having a monument threaded bore. The ring post has a ring for securing one or more elongate elements to the ring post. The ring post is configured to be attached to the monument top end via a threaded element engaging the monument threaded bore.

Also disclosed is a support system for supporting one or more elongate elements. The support system includes a bar member coupled to a structure, and one or more snap-on support assemblies mounted on the bar member. Each snap-on support assembly comprises a snap-on base having a base bottom portion and a base top portion. The base bottom portion is comprised of a spaced-apart pair of bottom portion attachment arms clamped onto the bar member. The base top portion is comprised of a monument co-molded with the base bottom portion and having a monument top end having a monument threaded bore. Each snap-on a sport assembly includes one or more ring posts, each having a ring for securing one or more elongate elements to the ring post. The one or more ring posts are attached to the monument top end via a threaded element engaging the monument threaded bore.

Also disclosed is a method of supporting one or more elongate elements on a bar member. The method includes providing a snap-on support assembly comprising a snap-on base and one or more ring posts. The snap-on base is comprised of a base bottom portion having a spaced-apart pair of bottom portion attachment arms, and a base top portion comprising a monument co-molded with the base bottom portion and having a monument top end having a monument threaded bore. The method additionally includes attaching the snap-on base to a bar member by urging the bottom portion attachment arms into clamping engagement with bar side walls of the bar member. In addition, the method includes attaching at least one ring post to the snap-on base by engaging a threaded element to the monument threaded bore. Furthermore, the method includes securing one or more elongate elements to the ring of the ring post.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

The FIGURES shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one configuration" or "a configuration." Instances of the phrases "one configuration" or "a configuration" do not necessarily refer to the same configuration. Similarly, this specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first," "second," etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof"

includes combinations having at least one of the associated listed items, wherein the combination can further include additional, like non-listed items.

As used herein, the phrase “at least one of,” when used with a list of items, means different combinations of one or more of the listed items may be used, and only one of each item in the list may be needed. In other words, “at least one of” means any combination of items and number of items may be used from the list, but not all of the items in the list are required. The item may be a particular object, a thing, or a category.

Figure 2:
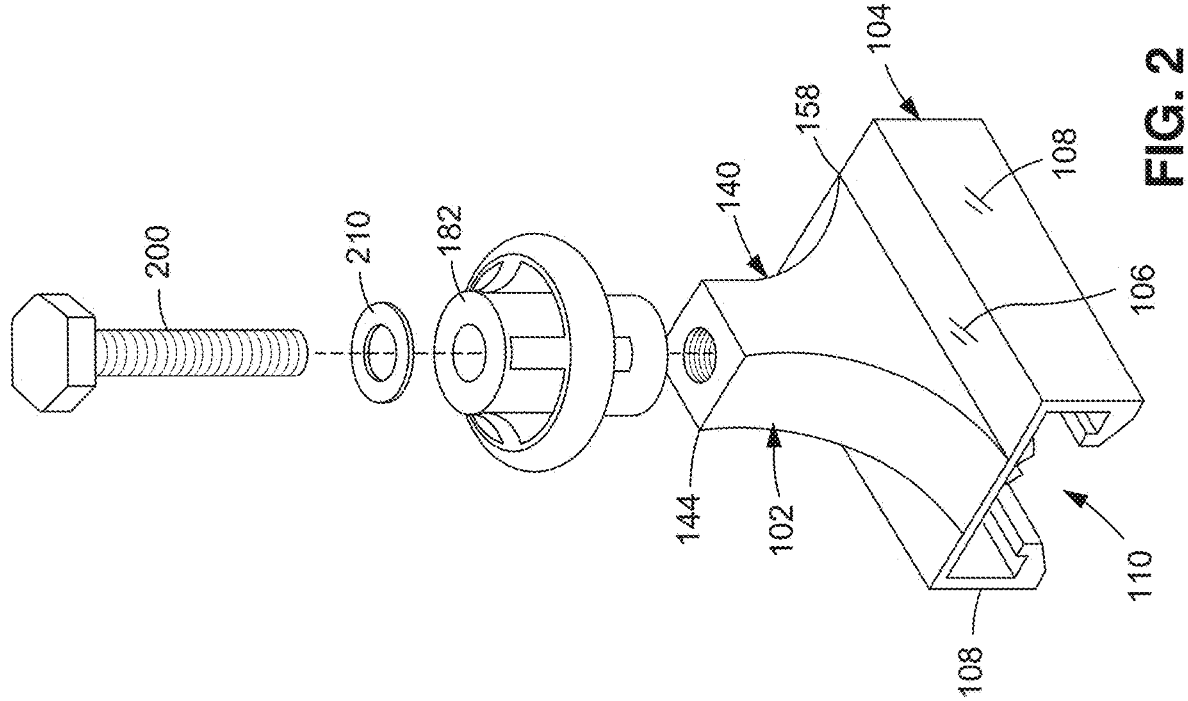
FIG. 2 is an exploded view of the snap-on support assembly of FIG. 1.
Figure 1:
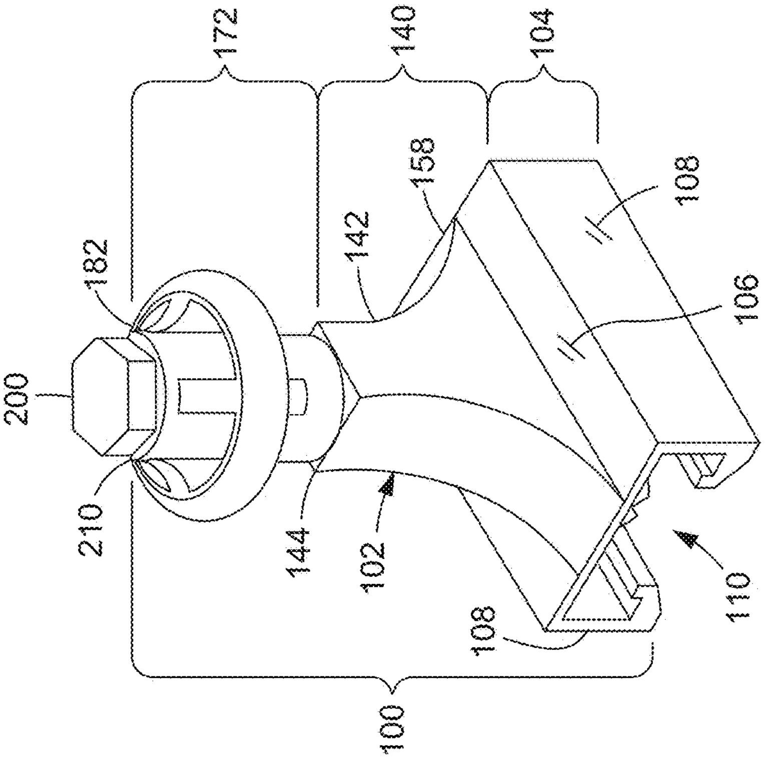
FIG. 1 shows an example of a snap-on support assembly having a ring post assembled to a snap-on base.
Figure 9:
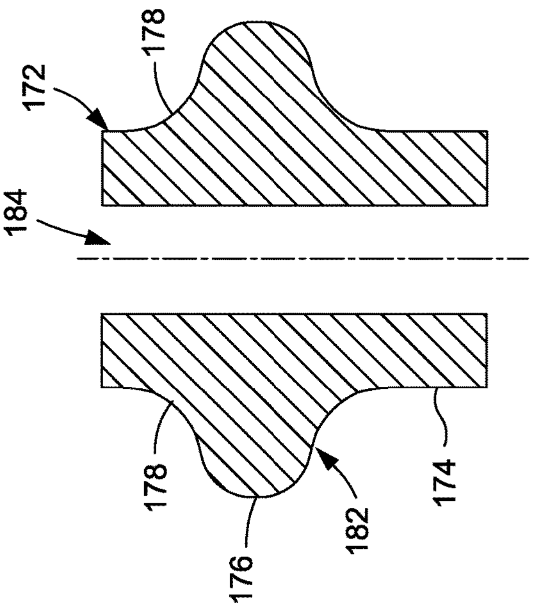
FIG. 9 is a sectional view of the hollow ring post of FIGS. 7-8.
Figure 8:
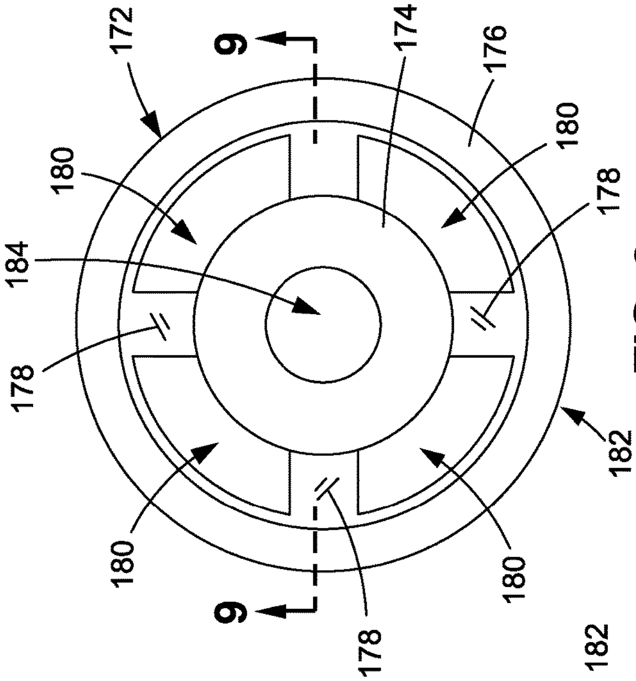
FIG. 8 is a top-down view of the hollow ring post of FIG. 7.
Figure 7:
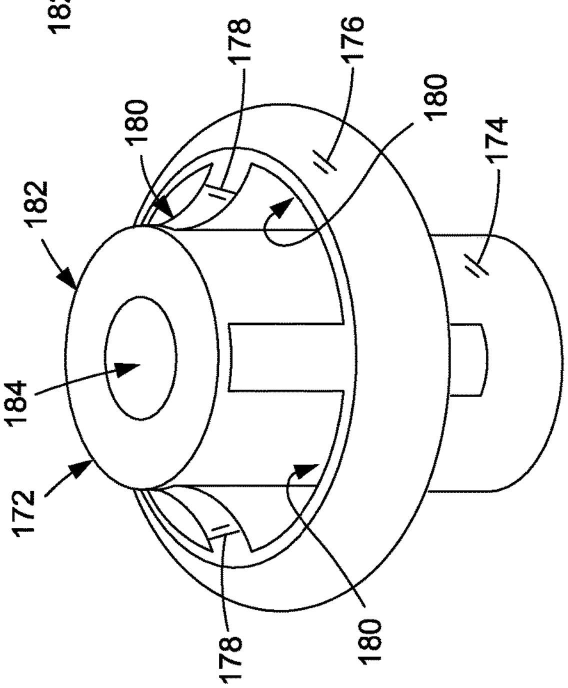
FIG. 7 is a perspective view of an example of a hollow ring post having a single ring and a ring post through-hole for receiving a threaded element configured to engage the monument threaded bore for securing the hollow ring post to the snap-on base
Figure 29:
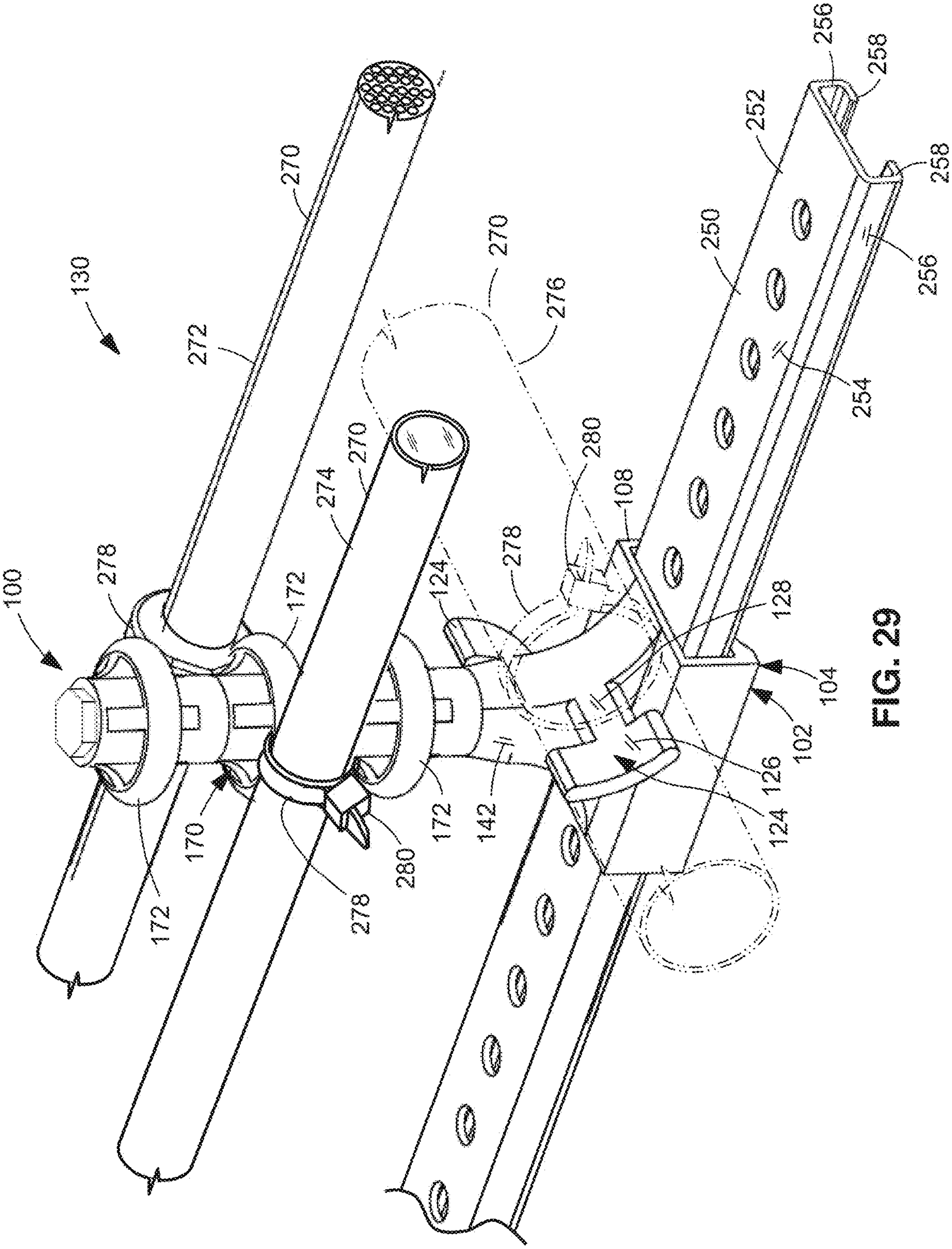
FIG. 29 is a top-down perspective view of an example of a snap-on support assembly mounted to a spanner bar, and illustrating a wire harness, a cable, and tubing secured to the snap-on support assembly via cable ties.

Referring now to the drawings which illustrate various examples of the disclosure, shown in FIGS. 1-2 is an example of a snap-on support assembly 100 as disclosed herein. The snap-on support assembly 100 is configured to support elongate elements 270, (e.g., wire harnesses 272, cables 274, and tubing 276, etc.) on an elongate bar member 250 such as a spanner bar 252, as shown in FIG. 29 and described below. The snap-on support assembly 100 comprises a snap-on base 102 and at least one ring post 172 configured to be assembled to the snap-on base 102 via a threaded element 200. The ring post 172 in one example can be provided as a hollow ring post 182 as shown in FIGS. 7-9 and described in greater detail below. In another example, the ring post 172 can be provided as a studded ring post 186 as shown in FIGS. 16-19 and described in greater detail below.

The snap-on base 102 and the ring post 172 are separate components of the snap-on support assembly 100. Both the snap-on base 102 and the ring post 172 are preferably formed (e.g., molded) of polymeric material such as plastic (e.g., Nylon™), However, the snap-on base 102 and the ring post 172 can be formed of any one of a variety of materials, including metallic materials and/or nonmetallic materials.

Figure 30:
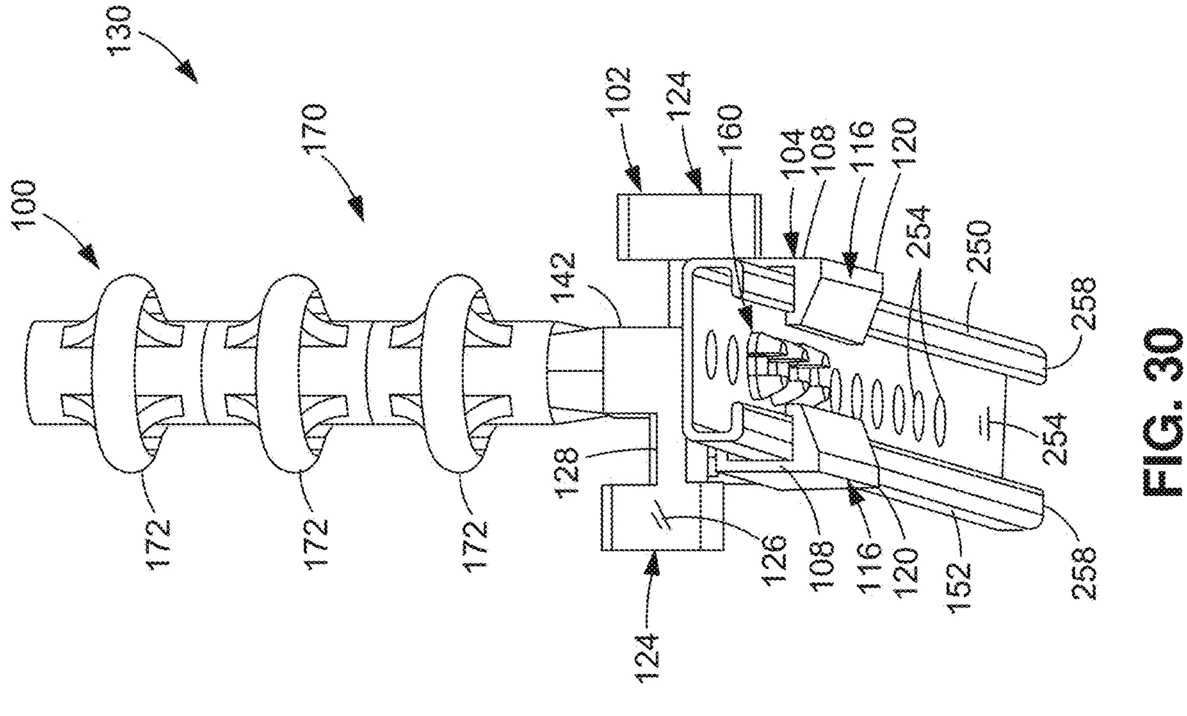
FIG. 30 is a bottom-up perspective view of the snap-on support assembly secured to the spanner bar.
Figure 34:
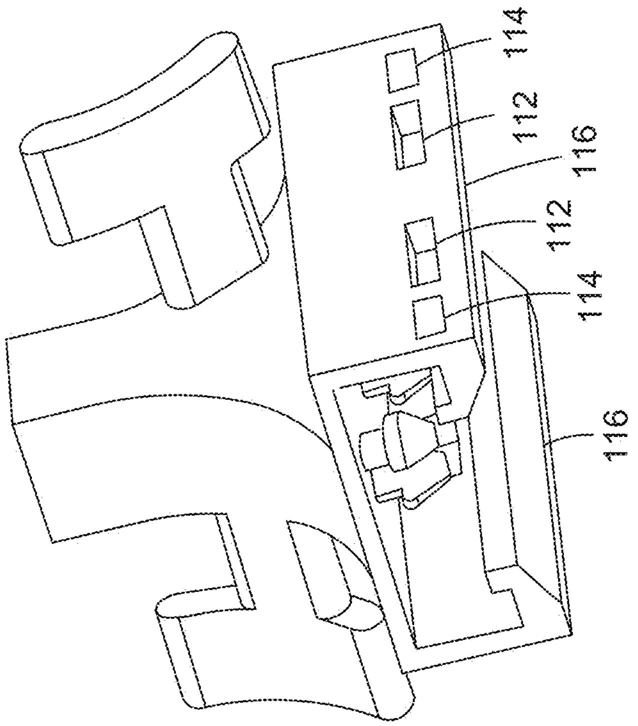
FIG. 34 is a further perspective view of the snap-on base of FIG. 32.

The snap-on base 102 is comprised of a base bottom portion 104 and a base top portion 140. The base bottom portion 104 has a bottom portion platform 106 interconnecting a spaced-apart pair of bottom portion attachment arms 108. The bottom portion attachment arms 108 protrude outwardly (e.g., downwardly) from the bottom portion platform 106, and collectively define a U-shaped channel 110 that is sized and configured complementary to the orthogonal cross-sectional shape of an elongate bar member 250 (FIGS. 29-30) such as a spanner bar 252. In the example of FIGS. 29, 30 and 34, the spanner bar 252 has a spaced pair of bar side walls 256 interconnected by a bar web 254.

As described below, the snap-on base 102 is configured to be mounted on an elongate bar member 250 such as a spanner bar 252 without the need for mechanical fasteners. This allows the snap-on support assembly 100 to be mounted on a bar member 250 in a reduced amount of time relative to conventional arrangements which require inserting a mechanical fastener such as a bolt through one or more ring posts and into a hole in the bar member, after which a washer and nut (not shown) must be secured on the portion of the fastener protruding from an underside of the spanner bar 252.

Referring to FIGS. 1-4, the base top portion 140 comprises a monument 142 which is co-molded with the base bottom portion 104. The monument 142 has a monument bottom end 158 and a monument top end 144. The monument 142 is a tower-like member protruding from the bottom portion platform 106 of the base bottom portion 104. In this regard, the monument 142 is integral with the base bottom portion 104 such that the snap-on base 102 is a single, unitary component.

When the snap-on base 102 is viewed from the side, the monument 142 flares outwardly from the monument top end 144 to the monument bottom end 158. When the snap-on base 102 is viewed from the end (e.g., FIG. 10), the monument 142 has a generally constant thickness. When the snap-on base 102 is viewed from a top-down direction, the monument 142 has an orthogonal cross-sectional shape, which increases in size from the monument top end 144 to the monument bottom end 158. However, the monument 142 may be provided in any one of a variety of alternative sizes, shapes, and/or configurations, and is not limited to the size, shape, and configuration of the snap-on base 102 shown in the FIGURES. For example, the monument 142 can have a circular cross section (not shown) when viewed from a top-down direction. Alternatively or additionally, the monument 142 can have a cross sectional shape and size that is constant (not shown) from the monument top end 144 to the monument bottom end 158.

Figure 4:
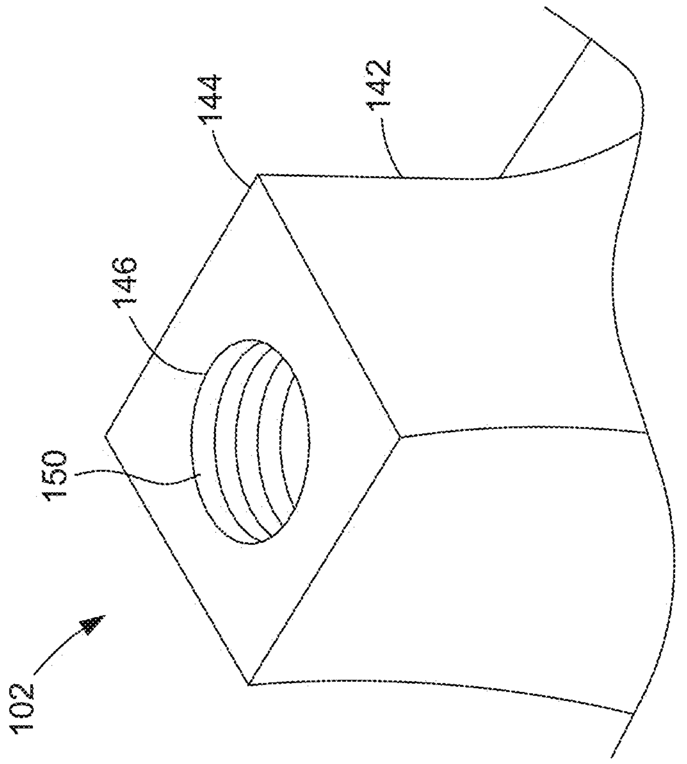
FIG. 4 is a magnified view of the base top portion comprising a monument having a monument threaded bore.
Figure 3:
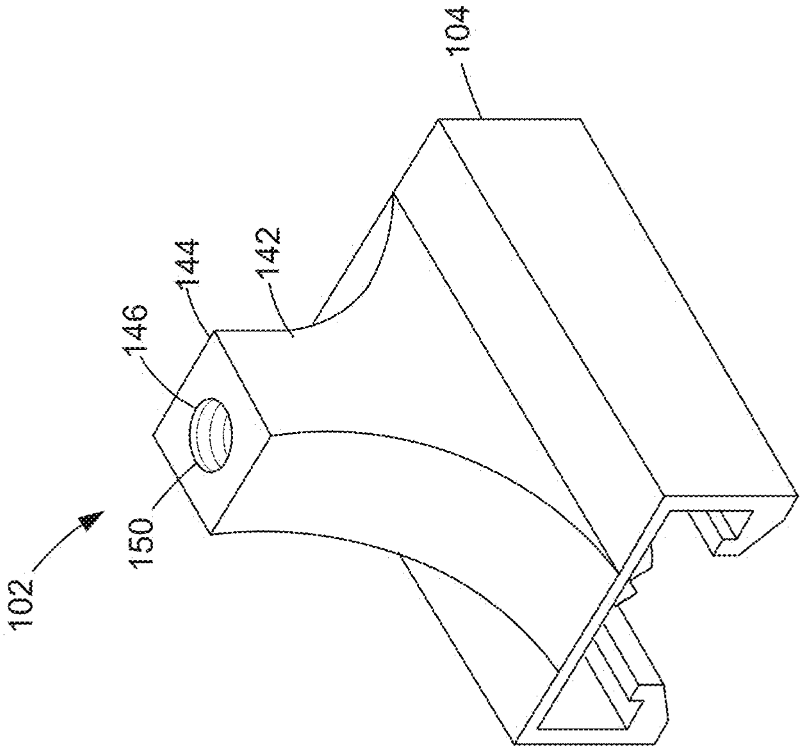
FIG. 3 shows an example of a snap-on base comprised of a base bottom portion and a base top portion.

Referring to FIGS. 3-4, shown is an example of the snap-on base 102 which the monument top end 144 has a monument threaded bore 146 containing internal threads 150 formed directly in the material of the monument top end 144. In the example shown, the monument threaded bore 146 is geometrically centered on the monument top end 144, which is a generally flat surface. However, in other examples not shown, the monument threaded bore 146 can be offset from the geometric center of the monument top end 144. In the example shown, the internal threads 150 of the monument threaded bore 146 extend partially into the monument 142. However, in other examples not shown, the threaded bore can extend through the full height of the monument 142 from the monument top end 144 to the monument bottom end 158.

Figure 6:
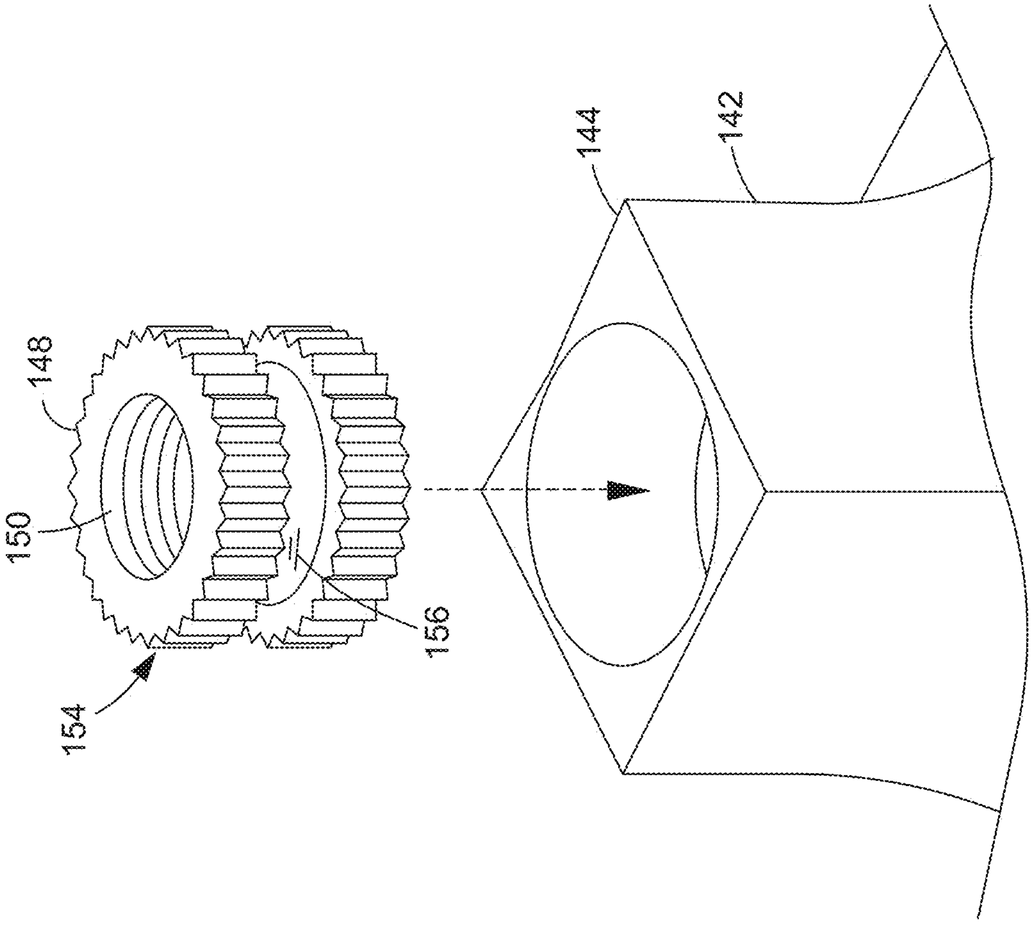
FIG. 6 is an exploded magnified view of the monument showing the monument metal insert separated away from the monument.
Figure 5:
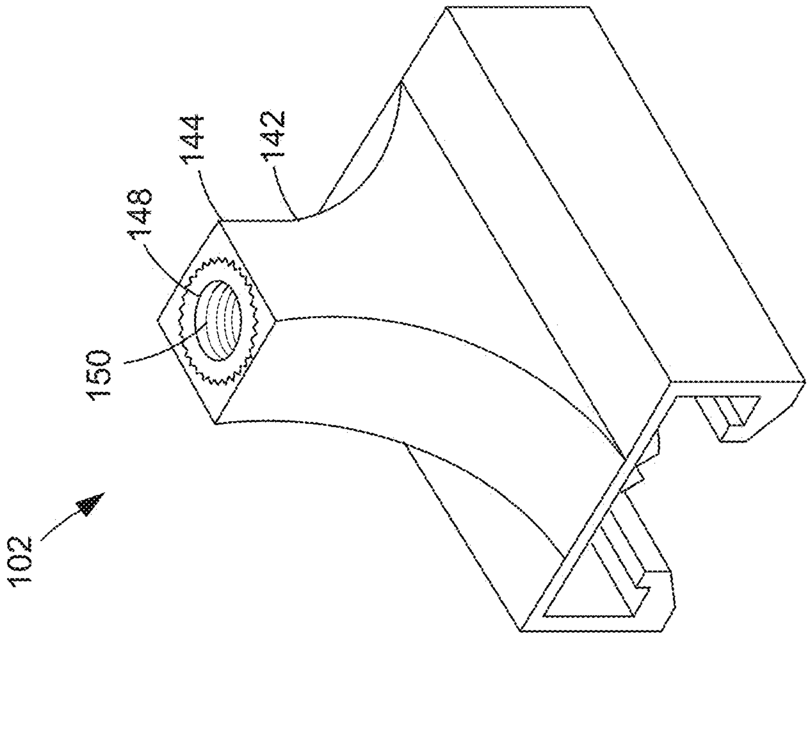
FIG. 5 shows an example of a snap-on base in which a monument metal insert is embedded in top end of the monument.

Referring to FIGS. 5-6, shown is an example of a snap-on base 102 in which the monument 142 has a monument metal insert 148 embedded in the monument top end 144. The monument metal insert 148 can be molded into the monument 142 during the process of manufacturing (i.e., molding) the snap-on base 102. However, the monument metal insert 148 can also be inserted (e.g., press fit) into a bore formed in the monument 142 after the molding process is complete.

The monument metal insert 148 has internal threads 150 that define the monument threaded bore 146. As shown in FIG. 6, the monument metal insert 148 has an insert outer surface 152 that has a texture 154 that prevents rotation of the monument metal insert 148 within the monument 142. In the example of FIG. 6, the texture 154 of insert outer surface 152 includes vertical ridges configured to engage with the material of the monument 142 in a manner preventing rotation of the monument metal insert 148, such as when tightening a threaded element 200 (FIG. 2) or assembling a ring post 172 to the snap-on base 102. In the example shown, the insert outer surface 152 includes a circumferential groove 156 configured to engage with the material of the monument 142 in a manner preventing axial movement of the monument metal insert 148 relative the monument top end 144. For example, the circumferential groove 156 prevents the monument metal insert 148 from pulling out of the monument 142 when tightening the threaded element 200 to attach a ring post 172 to the snap-on base 102.

Referring to FIGS. 7-9 and 16-19, shown are the above-mentioned examples of the ring post 172. In each ring post configuration disclosed herein, the ring post 172 is preferably formed of polymeric material (e.g., Nylon™) and is manufactured (e.g., molded) as a separate component from the snap-on base 102, as mentioned above. Each ring post 172 has at least one ring 176. The ring 176 is concentrically supported on a post 174 via a plurality of radially extending spokes 178. Although the FIGURES show each ring post 172 having four spokes 178, other examples of the ring post 172 can include as few as two spokes 178 or, more preferably, at least three spokes 178 securing the ring 176 to the post 174.

The plurality of spokes 178 collectively form a corresponding plurality of slots 180 respectively between the plurality of spokes 178. As shown in FIG. 29 and described below, the slots 180 provide a means for attaching an elongate element 270 such as a wire harness 272, table, or tubing 276 to the ring 176 of the ring post 172. For example, cable ties 278, tie straps, zip ties, or any one of a variety of other flexible elements can be inserted through the slots 180 for securing an elongate element 270 to a ring post 172. For example, FIG. 29 shows the use of cable ties 278 for securing a wire harness 272, a cable 274, and tubing 276 to different locations on a snap-on support assembly 100. To secure the wire harness 272 and the cable 274 respectively to the two rings of the snap-on support assembly 100, one end of a cable tie 278 is inserted through a slot 180 in the ring 176 and the cable tie 278 is then looped back onto itself, encircling the wire harness 272 or cable 274, and the end of the cable tie 278 is then inserted through its buckle 280.

As mentioned above, the ring post 172 is configured to be attached to the monument top end 144 via a threaded element 200 engaging the internal threads 150 of the monument threaded bore 146. In this regard, the threaded element 200 secures the ring post 172 to the snap-on base 102. As described below, the threaded element 200 can be a fastener 202 (e.g., FIGS. 1-2 and 10-13) that is a separate component from the ring post 172, or the threaded element 200 can be integral with the ring post 172 (e.g., FIGS. 15-20). Regardless of its configuration, the threaded element 200 is preferably formed of a high-strength material. For example, the threaded element 200 is preferably formed of steel or titanium, or a high-strength non-metallic material such as high-strength polymeric material (e.g., Nylon™).

In the ring post examples shown, the ring 176 and the post 174 each have a circular cross sectional shape when viewed from an axial direction (e.g., a top-down direction). However, in other examples not shown, the ring 176 and/or the post 174 can have an orthogonally shaped cross section, such as a square cross-sectional shape. A square shape of the ring 176 results in flat sides that increase the length of the slots 180, making it easier to secure an elongate element 270 to the ring 176 via cable ties 278 or other mechanisms. Furthermore, although the FIGURES show each ring post 172 having a single ring 176, in other examples not shown, a ring post 172 can have more than one ring 176. For example, a ring post 172 can be manufactured (e.g., molded) with exactly two rings (not shown) that are axially spaced apart from each other and which are each secured to the post 174 via a plurality of radially extending spokes 178 in the same manner as shown in the FIGURES.

Referring to FIGS. 7-9, shown is an example of a hollow ring post 182. The hollow ring post 182 has a centrally located ring post through-hole 184 extending from a ring post top end 188 to a ring post bottom end 194. As mentioned above, the hollow ring post 182 has a ring 176 concentrically supported on the post 174 via a plurality of radially extending spokes 178. The hollow ring post 182 is preferably molded of polymeric material such as Nylon™ or other suitable material as mentioned above.

Figure 11:
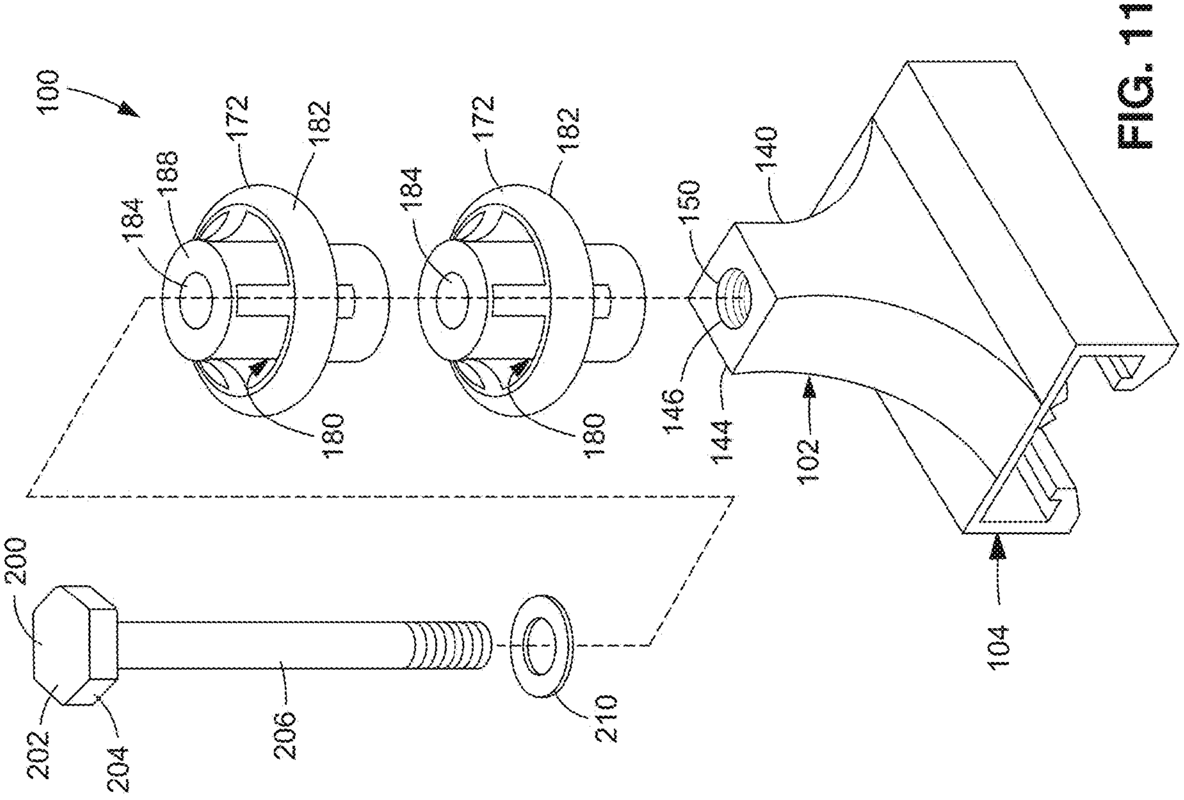
FIG. 11 is an exploded view of the snap-on support assembly of FIG. 10.
Figure 10:
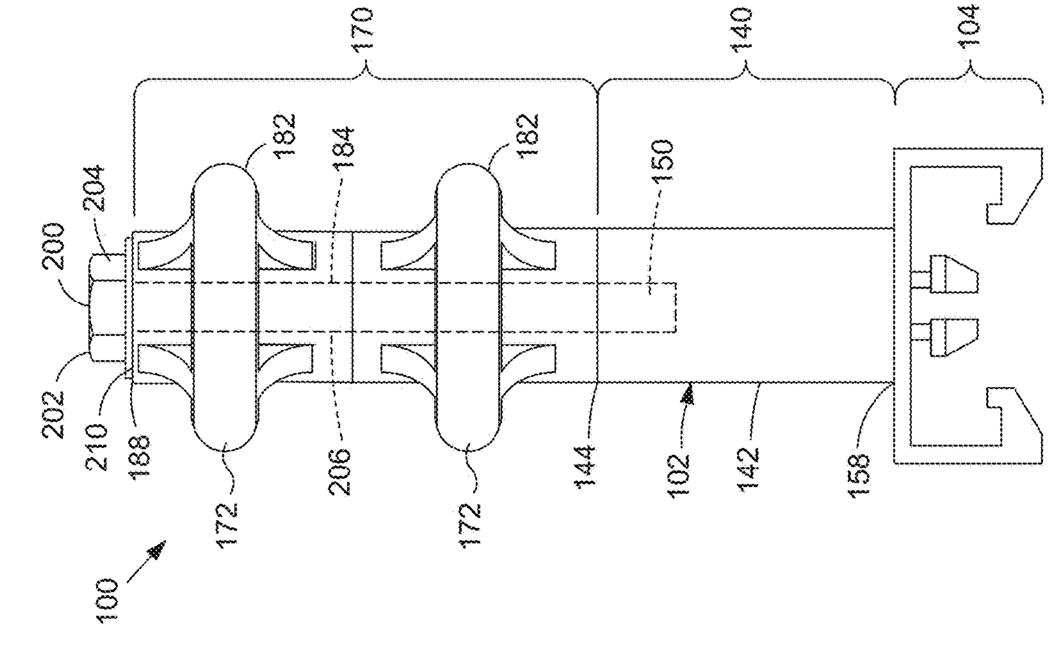
FIG. 10 is a side view of an example of a snap-on support assembly having a ring post stack comprised of two hollow ring posts stacked end-to-end and secured to the snap-on base via a threaded element in the form of a bolt.

Referring to FIGS. 10-11, shown is an example of a snap-on support assembly 100 having a ring post stack 170 comprised of two hollow ring posts 182 stacked on top of each other. For snap-on support assemblies 100 that contain at least one hollow ring post 182, a threaded element 200 in the form of a mechanical fastener 202 is used to secure the hollow ring post 182 to the snap-on base 102. The fastener 202 has a fastener head 204 and a fastener shaft 206 having a length configured to extend through the ring post through-holes 184 of the one or more hollow ring posts 182. The free end of the fastener shaft 206 is a threaded portion 208 configured to threadably engage the internal threads 150 of the monument metal insert 148 (e.g., FIG. 5-6), or threadably engage internal threads 150 formed directly in the monument top end 144 (e.g., FIGS. 3-4).

In the example shown, the fastener head 204 of the bolt is a hex head. A washer 210 is installed between the fastener head 204 and the ring post top end 188 to protect the ring post top end 188 during tightening of the fastener 202. Although the fastener 202 in FIGS. 1-2 and 10-13 is shown as a hex-headed bolt, the fastener 202 can be provided in any one of a variety of alternative configurations including, but not limited to, a Phillips-head screw, a slot-head screw, an Allen screw, or other fastener configurations.

In any ring post stack 170 example disclosed herein, the ring posts 172 are preferably rotated or clocked in a manner such that the slots 180 in the ring posts 172 are aligned with each other when the ring post stack 170 is viewed from an axial direction. The ring post through-holes 184 of the hollow ring posts 182 are preferably non-threaded and have a diameter that is complementary to the diameter of the fastener 202, allowing each hollow ring post 182 to be independently rotated into alignment with the one or more other hollow ring posts 182 of the ring post stack 170.

Figure 13:
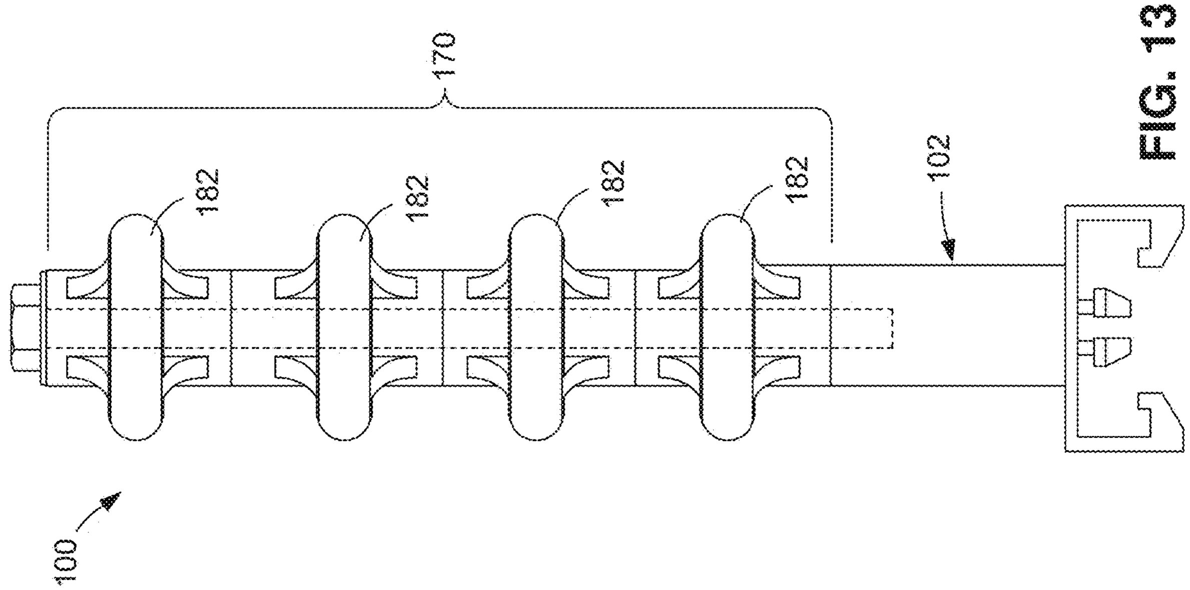
FIG. 13 is a side view of an example of a snap-on support assembly having a ring post stack comprised of four hollow posts stacked end-to-end secured to the snap-on base.
Figure 12:
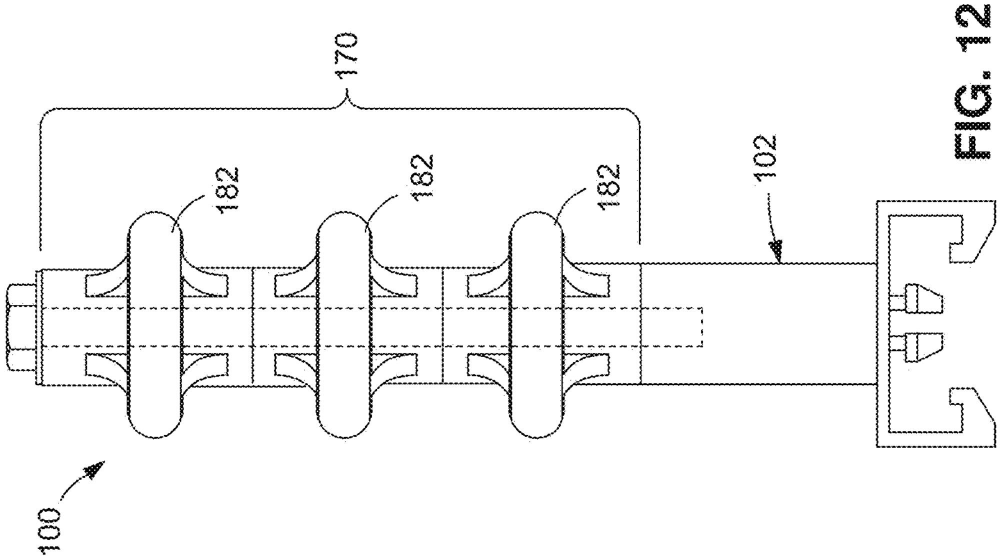
FIG. 12 is a side view of an example of a snap-on support assembly having a ring post stack comprised of three hollow ring posts stacked end-to-end and secured to the snap-on base via a threaded element in the form of a bolt.

Although FIGS. 10-11 show a ring post stack 170 having two hollow ring posts 182, a ring post stack 170 can include any number of ring posts 172. For example, FIG. 12 shows an example of a snap-on support assembly 100 having a ring post stack 170 comprised of three hollow ring posts 182 stacked end-to-end and secured to a snap-on base 102 via a hex-head bolt. FIG. 13 shows an example of a snap-on support assembly 100 having a ring post stack 170 comprised of four hollow ring posts 182 stacked end-to-end and secured to the snap-on base 102. As may be appreciated, a ring post stack 170 can include any number of ring posts 172 stacked end to end, and preferably up to six ring posts 172.

Figure 15:
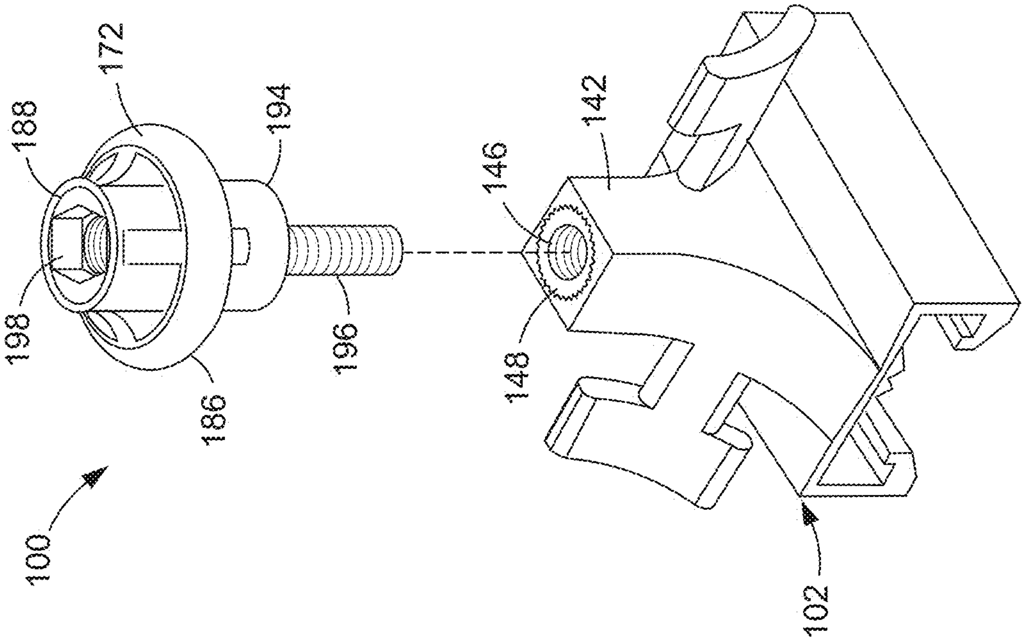
FIG. 15 is an exploded view of the snap-on support assembly of FIG. 14.
Figure 14:
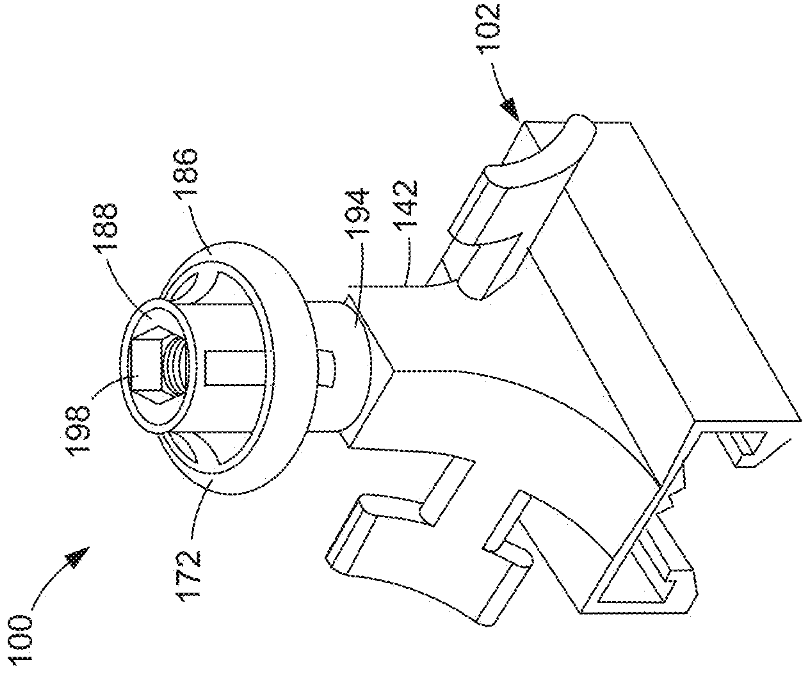
FIG. 14 shows an example of a snap-on support assembly having a studded ring post assembled to a snap-on base.
Figure 17:
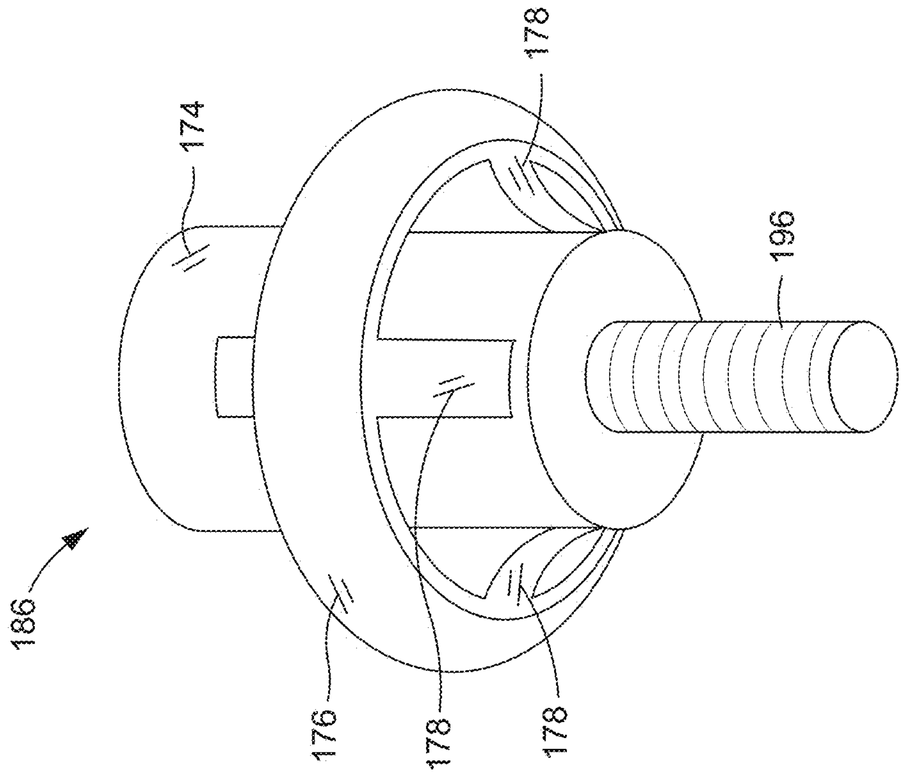
FIG. 17 is a bottom-a perspective view of the studded ring post of FIG. 16.

Referring to FIGS. 14-15, shown is an example of a snap-on support assembly 100 in which the ring post 172 is a studded ring post 186. The studded ring post 186 has a ring post bottom end 194 and a ring post top end 188. The ring post bottom end 194 has a threaded stud 196 extending downwardly from the ring post 172. In FIG. 14, the threaded stud 196 is threadably engaged to the monument threaded bore 146 (e.g., of the monument metal insert 148), thereby securing the studded ring post 186 to the snap-on base 102.

Referring to FIGS. 16-19, shown is an example of the studded ring post 186. Similar to the above-described arrangement of the hollow ring post 182, the studded ring post 186 includes a ring 176 concentrically supported on a post 174 via a plurality of radially extending spokes 178. The studded ring post 186 is preferably molded of polymeric material such as Nylon™ or other suitable material as mentioned above. The upper portion of the threaded stud 196 is embedded in the lower portion of the post 174 during the molding process. The upper portion of the post 174 has a ring post threaded bore 192 having internal threads 150 configured to receive another threaded element 200. For example, the threaded stud 196 of another studded ring post 186 can be engaged to the internal threads 150 of the ring post threaded bore 192.

In FIGS. 16-19, the ring post threaded bore 192 is defined by a ring post metal insert 190. The ring post metal insert 190 can be embedded in the upper portion of the post 174 during the molding process in a manner similar to the threaded stud 196. The ring post metal insert 190 has a hexagonal recess 198 configured to receive a hex-shaped tool such as an Allen wrench or a hex bit socket. Although not shown, the hex-shaped tool is used for rotating the studded ring post 186 when engaging the threaded stud 196 of the studded ring post 186 to a monument metal insert 148 of a snap-on base 102 or inserting the threaded stud 196 into the ring post threaded bore 192 (e.g., the ring post metal insert 190) of another studded ring post 186.

The size of the external threads on the threaded stud 196 matches the size of the internal threads 150 in the ring post metal insert 190, which matches the size of the internal threads 150 in the monument metal insert 148 (or monument threaded bore 146), allowing a ring 176 stack of any number of studded ring posts 186 to be assembled and secured to a snap-on base 102. In one example, the threads on the threaded stud 196, the ring post metal insert 190, and the monument metal insert 148 are 10-32 national fine (NF) threads (i.e., 3/16 inch diameter and a thread pitch of 32 threads-per-inch). However, the threads of the threaded stud 196, the ring post metal insert 190, and the monument metal insert 148 can be any one of a variety of alternative thread sizes.

Figure 22:
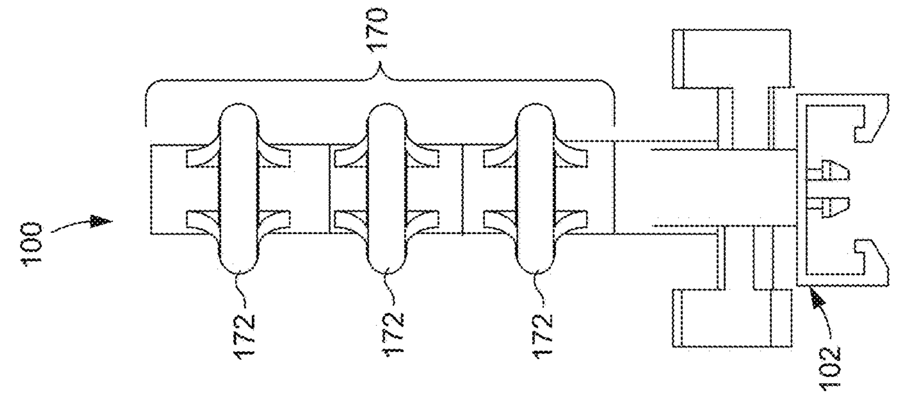
FIG. 22 is a side view of the snap-on support assembly of FIGS. 20-21.
Figure 21:
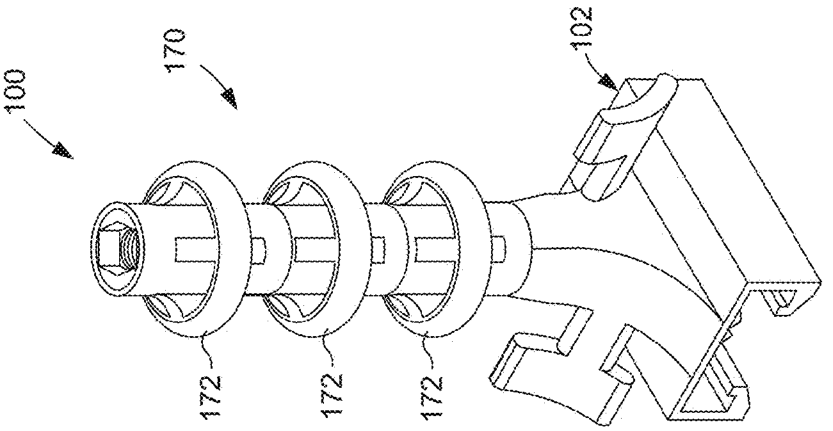
FIG. 21 is an assembled view of the snap-on support assembly of FIG. 20 showing the studded ring posts threadably engaged to each other and to the snap-on base.
Figure 20:
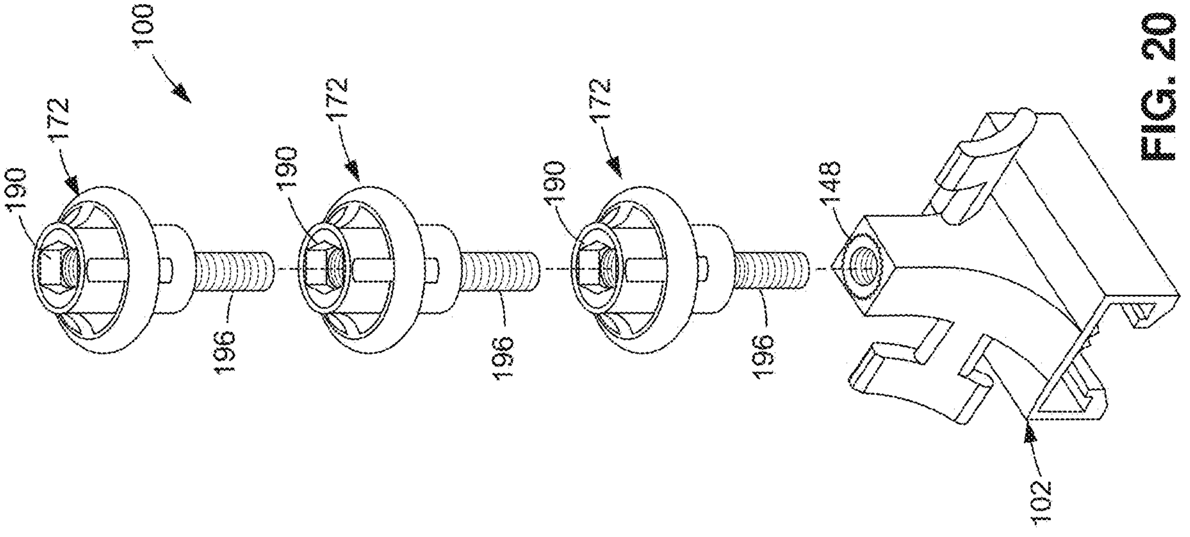
FIG. 20 is an exploded view of an example of a snap-on support assembly having a ring post stack comprised of three studded ring posts.

Referring to FIGS. 20-22, shown is an example of a snap-on support assembly 100 having a ring post stack 170 comprised of three studded ring posts 186. The ring post stack 170 is assembled by inserting the threaded studs 196 of the top two studded ring posts 186 into the ring post metal inserts 190 of the bottom two studded ring posts 186. The ring post stack 170 is secured to the snap-on base 102 by engaging the threaded stud 196 of the bottom-most studded ring post 186 to the monument metal insert 148. Although FIGS. 20-22 show the ring post stack 170 having three studded ring posts 186, any number of studded ring posts 186 can be assembled to form a ring post stack 170.

Figure 23:
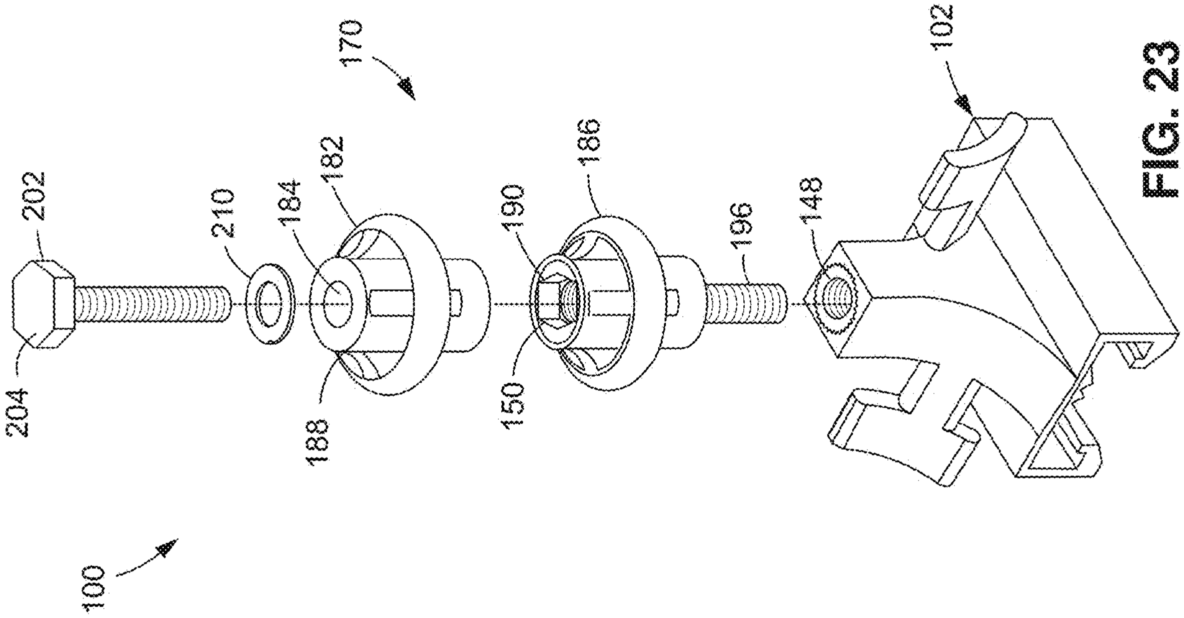
FIG. 23 is an exploded view of an example of a snap-on support assembly having a ring post stack comprised of a studded ring post and a hollow ring post.

Referring to FIG. 23, shown is an exploded view of an example of a snap-on support assembly 100 having a ring post stack 170 comprised of a studded ring post 186 and a hollow ring post 182. The studded ring post 186 is assembled to the snap-on base 102 by engaging the threaded stud 196 to the monument metal insert 148. The hollow ring post 182 is assembled to the studded ring post 186 by inserting a fastener 202 such as a bolt into the ring post through-hole 184 and engaging the internal threads 150 of the ring post metal insert 190 of the studded ring post 186. As mentioned above, the washer 210 is installed underneath the fastener head 204 to protect the ring post top end 188 of the hollow ring post 182. Although FIG. 23 shows a single hollow ring post 182 assembled to a studded ring post 186, any number of hollow ring posts 182 can be assembled on top of any number of studded ring posts 186 via a fastener 202 such as a bolt extending through the hollow ring posts 182 and engaging the internal threads 150 of the ring post metal insert 190 of the top studded ring post 186.

Figure 24:
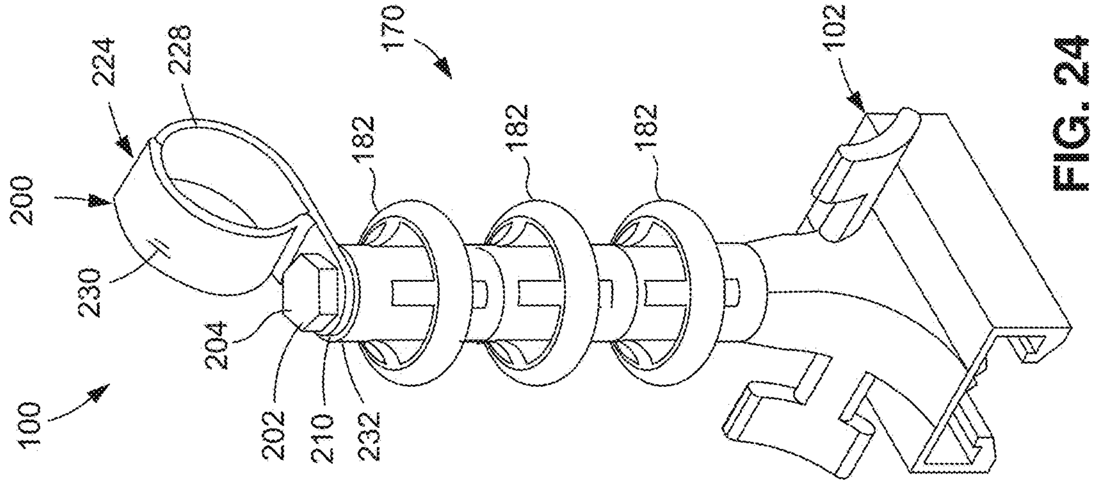
FIG. 24 is an assembled view of a snap-on support assembly comprised of a p-clamp band assembly mounted on top of a ring post stack.

Referring to FIG. 24, shown is an assembled view of a snap-on support assembly 100 comprised of an apparatus 220 in the form of a p-clamp 224 mounted on top of a ring post stack 170. The ring post stack 170 is comprised of three hollow ring posts 182 secured to the snap-on base 102 via a fastener 202 such as a bolt. Alternatively, the ring post 172 on the bottom of the ring post stack 170 can be a studded ring post 186, and the two ring posts 172 on top of the studded ring post 186 can both be hollow ring posts 182. In yet another alternative, the bottom two ring posts 172 of the ring post stack 170 can be studded ring posts 186, and the top ring post 172 can be a hollow ring post 182.

In the example shown, the p-clamp 224 is a p-clamp band assembly 228 having a circular p-clamp body 230 and a flat mounting portion 232. The flat mounting portion 232 contains a hole (not shown) for receiving the bolt. The p-clamp band assembly 228 is configured for securing wires, wire harnesses 272, cables 274, tubing 276, and other elongate elements 270. In this regard, the p-clamp body 230 can be provided in any one of a variety of different sizes to accommodate different diameters of elongate elements 270.

Figure 26:
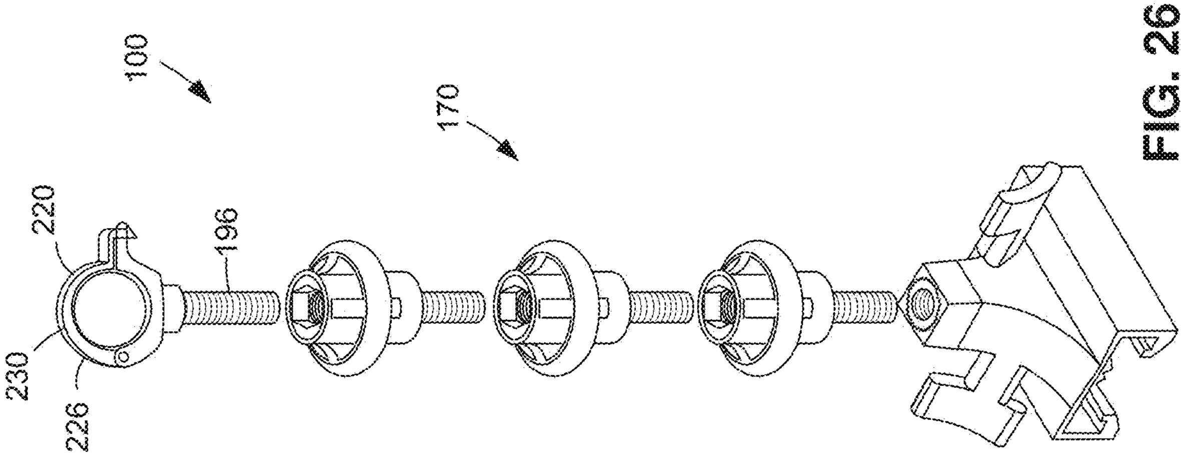
FIG. 26 is an exploded view of the snap-on support assembly of FIG. 25.
Figure 25:
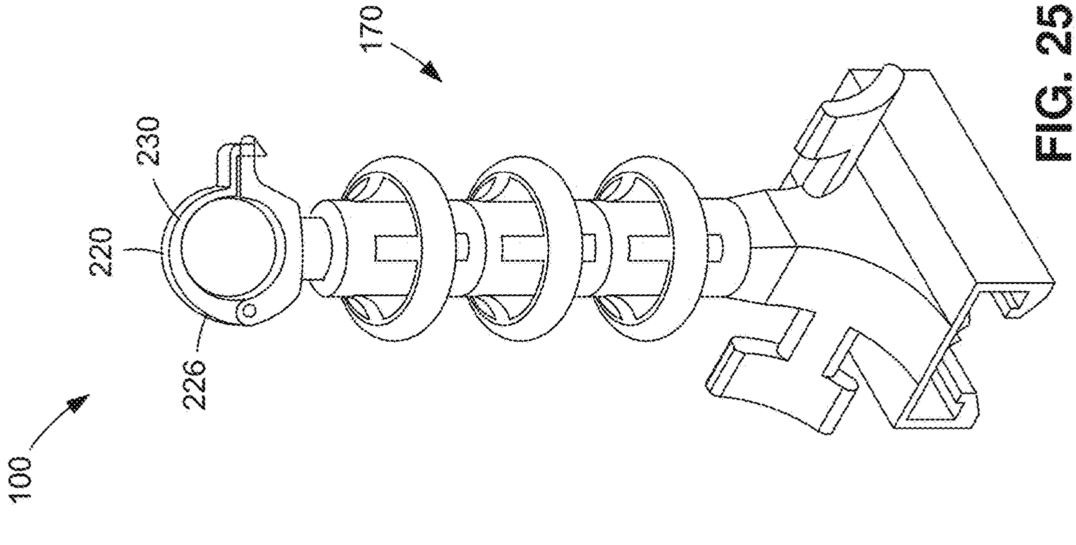
FIG. 25 shows an example of a snap-on support assembly having a p-clamp stud assembly mounted on top of a ring post stack.

Referring to FIGS. 25-26, shown is an example of a snap-on support assembly 100 in which the apparatus 220 mounted on top of the ring post stack 170 is a p-clamp stud assembly 226. The p-clamp stud assembly 226 has a circular p-clamp body 230 and a threaded stud 196 extending downwardly from the p-clamp body 230. The p-clamp body 230 has a hinge on one side and a latch closure on an opposite side for securing wire harnesses 272, cables 274, tubing 276, and other elongate elements 270. As may be appreciated, a snap-on support assembly 100 can include any one of a variety of alternative apparatuses 220 mounted on a ring post 172, and is not limited to the p-clamp 224 configurations shown in FIGS. 24-26.

Figure 28:
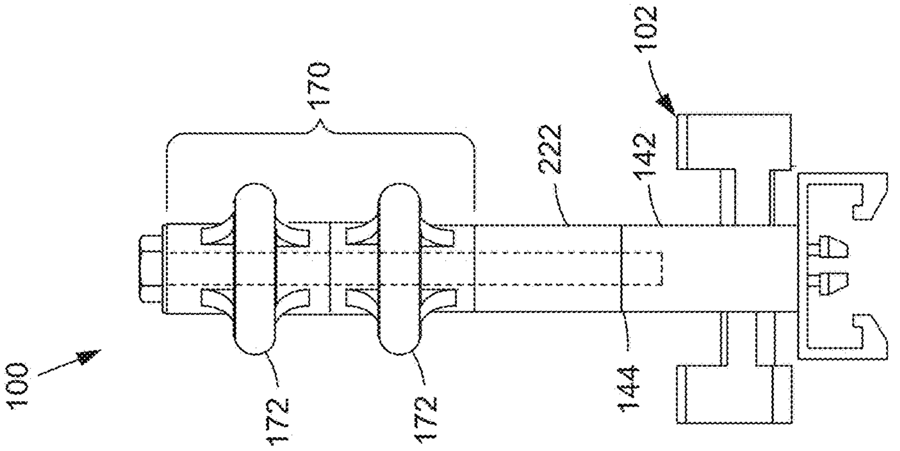
FIG. 28 is a side view of the snap-on support assembly of FIG. 27.
Figure 27:
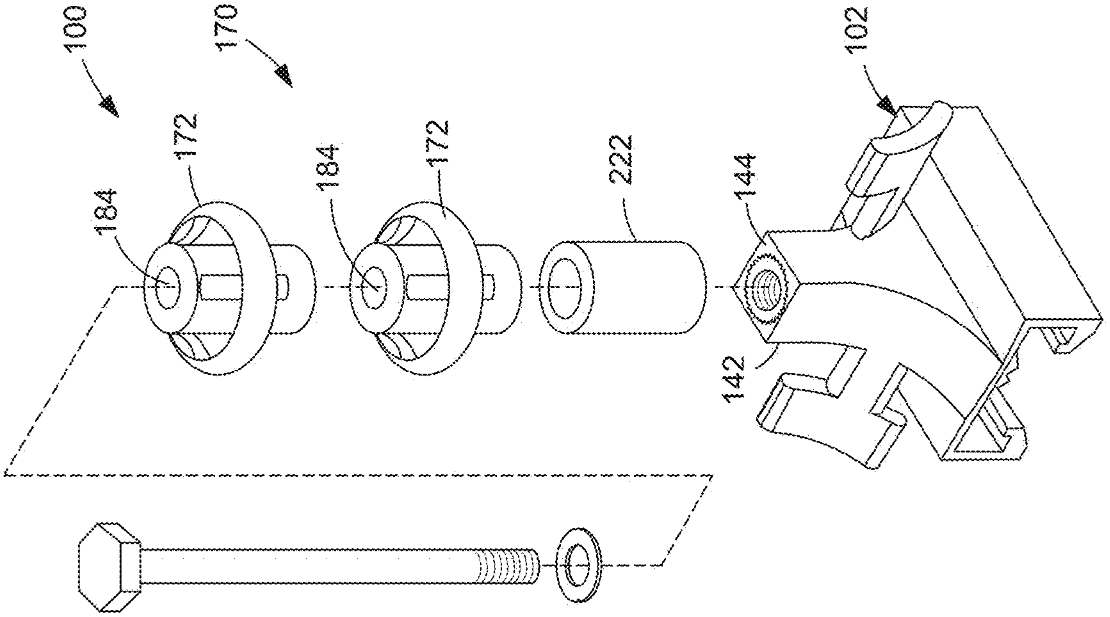
FIG. 27 is an exploded view of an example of a snap-on support assembly having a spacer mounted between a ring post stack and a snap-on base.

Referring to FIGS. 27-28, shown is an example of a snap-on support assembly 100 having a spacer 222 installed between a ring post stack 170 and a snap-on base 102. More specifically, the spacer 222 is installed between the monument top end 144 and the bottom ring post 172. In the example shown, the spacer 222 has a tubular shape having an inner diameter that is complementary to the ring post through-hole 184. The outer diameter of the spacer 222 is complementary to the outer diameter of the ring posts 172 in the ring post stack 170. The spacer 222 advantageously increases the distance between the bottom ring post 172 and the monument 142, as may be required for providing clearance for elongate elements 270 secured to the snap-on base 102 (e.g., FIG. 29). Although shown installed between the snap-on base 102 and a ring post stack 170, the spacer 222 can be installed at any location in a snap-on support assembly 100. For example, although not shown, a snap-on support assembly 100 can be assembled with a spacer 222 installed between two hollow ring posts 182 at any location along a ring post stack 170.

Figure 37:
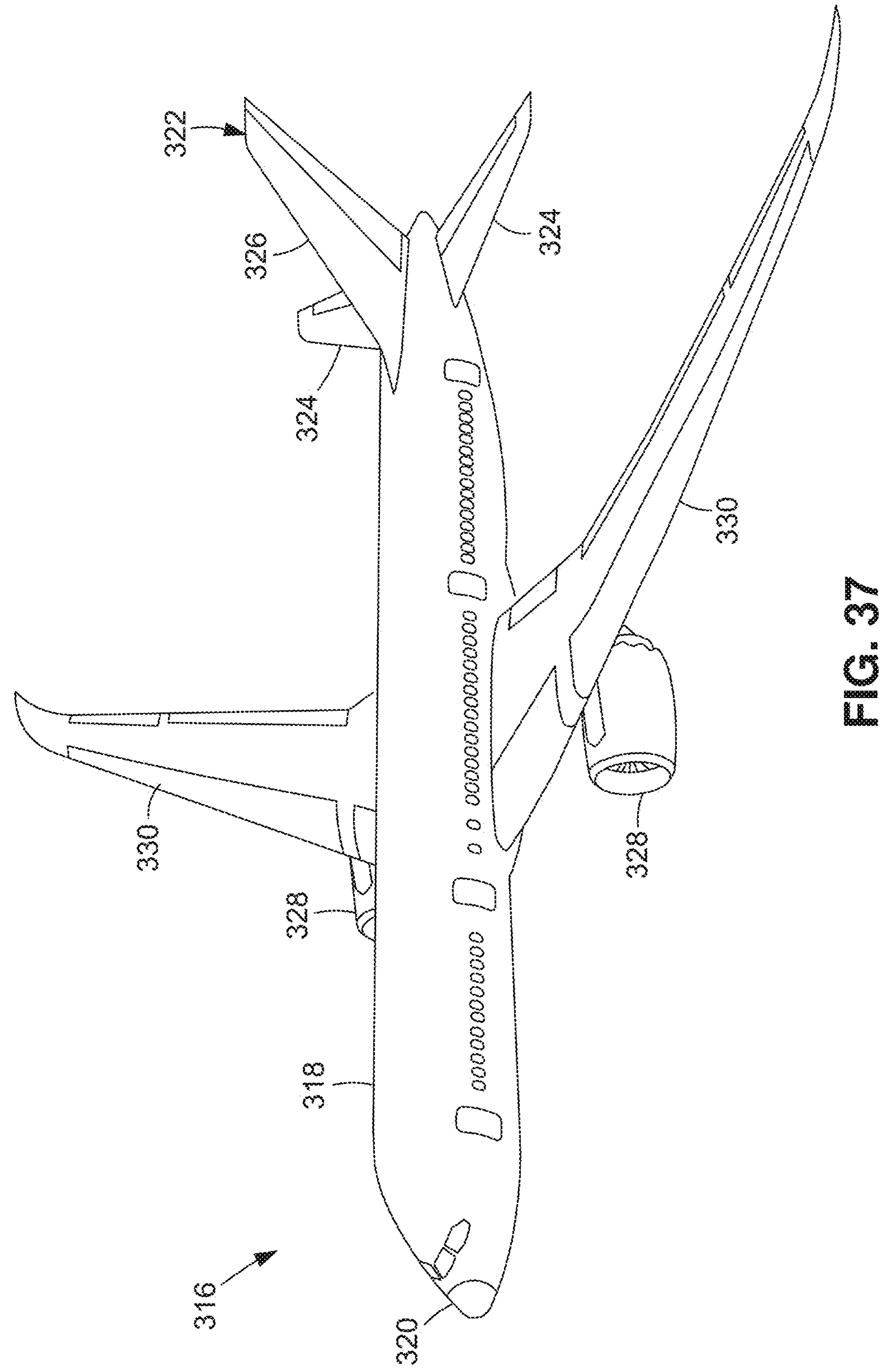
FIG. 37 illustration of an example of an aircraft incorporating one or more versions of a snap-on support assembly as presently disclosed.

Referring to FIGS. 29-30, shown is an example of a support system 130 comprising a snap-on support assembly 100 installed on an elongate bar member 250 in the form of a spanner bar 252. As mentioned above, one or more spanner bars 252 can be attached to the internal structure of an aircraft 316 (FIG. 37) or other structure. Spanner bars 252 can be provided in any length. Although shown in FIGS. 29-30 as having a straight shape, a spanner bar 252 can be provided in a curved shape (not shown). The spanner bar 252 is preferably formed of a high-strength and rigid material such as metallic material (e.g., aluminum, steel) and/or non-metallic material (e.g., polymeric material, composite material). Although FIG. 29-30 show a support system 130 comprising a single snap-on support assembly 100 mounted on the spanner bar 252, a support system 130 can include any number of snap-on support assemblies 100 mounted on the spanner bar 252.

In FIGS. 29-32, the snap-on support assembly 100 has a ring post stack 170 comprised of three ring posts 172 stacked end-to-end and secured to the snap-on base 102. In the example shown, elongate elements 270 in the form of a wire harness 272 and a cable 274 are secured to the ring posts 172. However, any one of a variety of different types of elongate elements 270 can be secured to the ring post 172, such as coaxial cables, power transmission cables, fiber optic cables, and tubing 276 or conduits. Toward this end, any number of ring posts 172 can be included with a snap-on support assembly 100 to support any number of elongate elements 270.

Advantageously, if additional elongate elements 270 (e.g., wire harnesses 272, cables 274, tubing 276, etc.) need to be supported at a given location on a spanner bar 252, additional ring posts 172 can be stacked on top of the one or more existing rings posts. For example, one or more studded ring posts 186 can be assembled on top of an existing studded ring post 186 of a snap-on support assembly 100 (e.g., FIG. 20). Alternatively, one or more hollow ring posts 182 can be assembled on top of an existing studded ring post 186 of a snap-on support assembly 100, and a fastener 202 (e.g., a bolt) can be inserted into the ring post through-hole(s) 184 and fastened to the ring post metal insert 190 of the existing studded ring post 186 (e.g., FIG. 23).

In the example of FIG. 29, cable ties 278 are used to secure the wire harness 272 and the cable 274 to the ring posts 172. As mentioned above, to secure a cable tie 278 to a ring post 172, a free end of the cable tie 278 is inserted into a slot 180 of one of the rings 176, and the cable tie 278 is then looped back onto itself and inserted into a buckle 280 of the cable tie 278. However, any one of a variety of different types of flexible elements can be used to secure an elongate element 270 to a ring post 172, including zip ties and tie straps.

Figure 32:
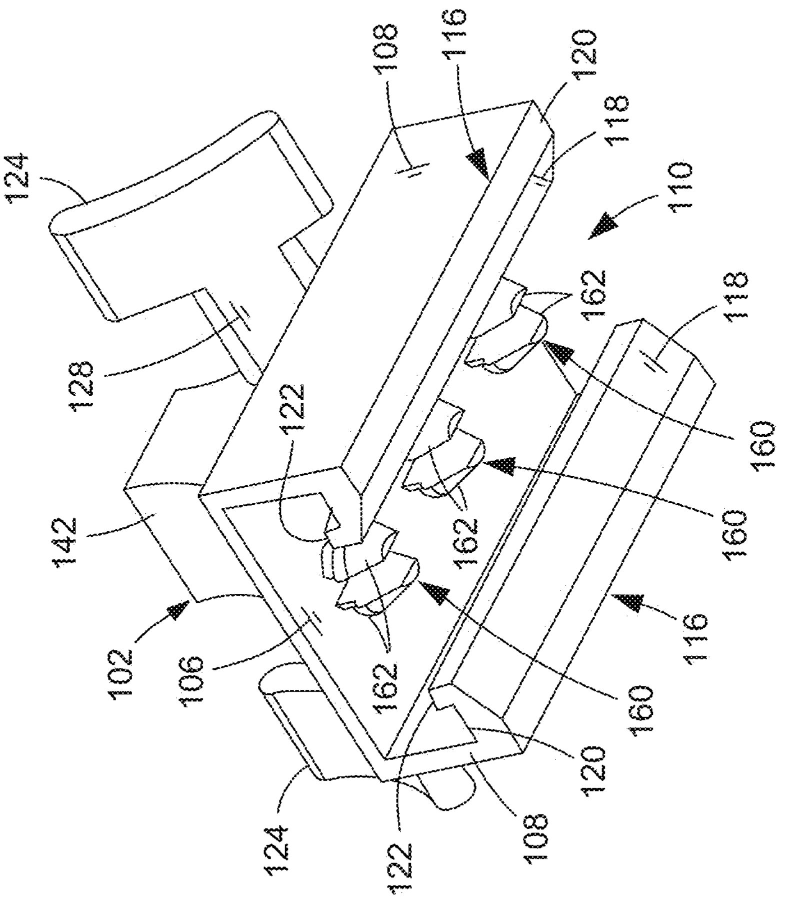
FIG. 32 is a bottom-up perspective view of an example of the snap-on base having retaining bosses protruding downwardly from the bottom portion platform.
Figure 31:
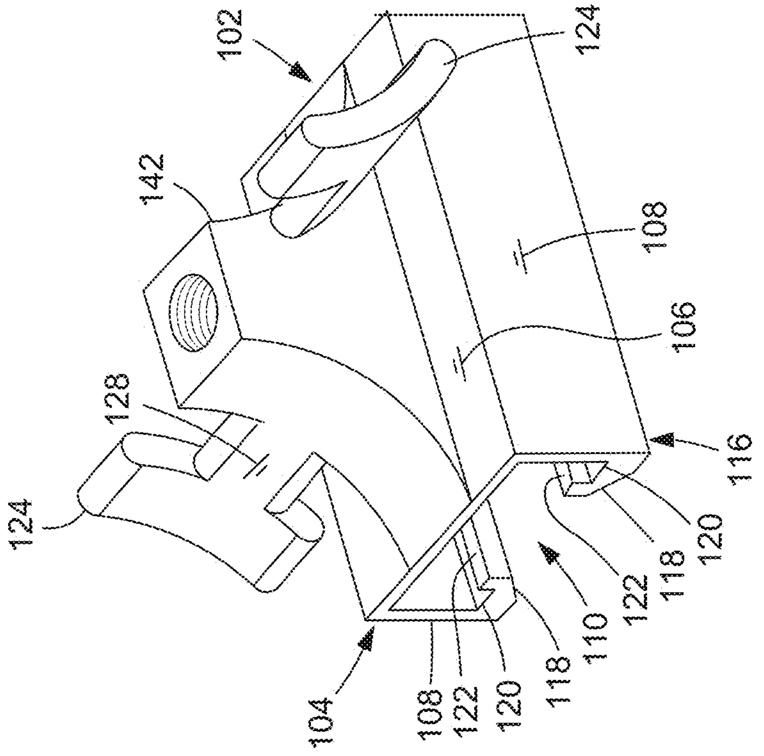
FIG. 31 shows an example of a snap-on base having curved support elements for supporting elongate elements such as the tubing shown in FIG. 29, and further illustrating a channel defined by a pair of bottom portion attachment arms interconnected by a bottom portion platform.

In the snap-on support assembly 100 of FIGS. 29-30, the snap-on base 102 has a pair of curved support elements 124 integrally formed (e.g., molded) with the snap-on base 102. The curved support elements 124 protrude from opposite sides of the monument 142 for supporting one or more elongate elements 270, in addition to the elongate elements 270 supported by the ring posts 172. Each of the curved support elements 124 is attached to the monument 142 via a support arm 128. In addition, each of the curved support elements 124 has a concavely curved surface 126 configured to receive an elongate element 270. As shown in FIG. 31-32, the concavely curved surfaces 126 of the pair of curved support elements 124 face in opposite directions. FIG. 29 shows only one of the curved support elements 124 is used to support a length of tubing 276, which is secured to the support arm 128 via a cable tie 278. However, both of the curved support elements 124 can be used for supporting any one of a variety of different types of elongate elements 270.

In FIGS. 29-30, the spanner bar 252 is comprised of a spaced pair of bar side walls 256 interconnected by a bar web 254. The bar side walls 256 extend perpendicularly from the bar web 254. The bar side walls 256 and the bar web 254 collectively define a U-shaped cross section of the spanner bar 252. The bottom edge of each bar side wall 256 has a bar lateral portion 258 protruding inwardly in a perpendicular direction from the bar side wall 256. The bar web 254 has a series of bar member holes 260 centered on the width of the bar web 254. In the example shown, the bar member holes 260 are uniformly spaced apart from each other. However, in other examples not shown, the bar member holes 260 can be non-uniformly spaced apart from each other.

Referring to FIGS. 29-30, the snap-on base 102 is attached to the spanner bar 252 via a one-step snap-on process. In this regard, the base bottom portion 104 of the snap-on base 102 is sized and shaped complementary to the cross-sectional shape of the bar member 250. For example, as shown in FIGS. 29-32, the base bottom portion 104 comprises a pair of bottom portion attachment arms 108 interconnected by a bottom portion platform 106, as mentioned above. The bottom portion attachment arms 108 and the bottom portion platform 106 collectively define a U-shaped cross section defining a channel 110 that is sized complementary to the U-shaped cross section of the bar member 250.

Referring to FIGS. 29-32, each of the bottom portion attachment arms 108 has a snap-on edge portion 116 configured for slidable engagement of the snap-on base 102 onto a bar member 250. For example, each snap-on edge portion 116 has a lateral flange 120 protruding inwardly. The bottom portion of the lateral flange 120 is a sloped surface 118 that causes the bottom portion attachment arms 108 to spread apart as the snap-on base 102 is manually urged onto the spanner bar 252. When the bottom portion platform 106 contacts the bar web 254 of the spanner bar 252, the bottom portion attachment arms 108 snap or move back toward each other, and the lateral flanges 120 engage with the underside of the bar lateral portions 258 of the spanner bar 252.

In FIG. 30, the base bottom portion 104 has a pair of vertical retaining strips 122 formed respectively along the lateral flanges 120 of the pair of bottom portion attachment arms 108. When the snap-on base 102 is completely installed on the spanner bar 252, the vertical retaining strips 122 are positioned against the vertical surfaces respectively of the bar lateral portions 258, thereby preventing the bottom portion attachment arms 108 from spreading apart, which would potentially allow the snap-on base 102 to separate from the spanner bar 252.

Referring to FIGS. 30 and 32, the base bottom portion 104 of the snap-on base 102 can optionally include one or more retaining bosses 160 protruding from the interior surface of the bottom portion platform 106 of the base bottom portion 104. The retaining bosses 160 protrude into the channel 110 defined by the bottom portion attachment arms 108 and the bottom portion platform 106. Each retaining boss 160 is sized and configured to engage with a bar member hole 260 in the bar web 254 of the bar member 250, and prevent movement of the snap-on base 102 relative to the bar member 250. Although the snap-on base 102 of FIG. 32 is shown with two retaining bosses 160, a snap-on base 102 can have any number of retaining bosses 160 including a single retaining boss 160 or three or more retaining bosses 160.

In the example of FIG. 32, each retaining boss 160 has the shape of a truncated cone, and is comprised of a pair of boss portions 162 which are formed as mirror images of each other and which are separated from each other by a gap. The gap allows the boss portions 162 to bend toward each other as the retaining boss 160 is inserted into a bar member hole 260 as the snap-on base 102 is pressed onto the bar member 250. Advantageously, the one or more retaining bosses 160 align and further secure the snap-on base 102 to the bar member 250. In addition, the one or more retaining bosses 160 prevent movement of the snap-on base 102 along a lengthwise direction of the bar member 250.

Figure 33:
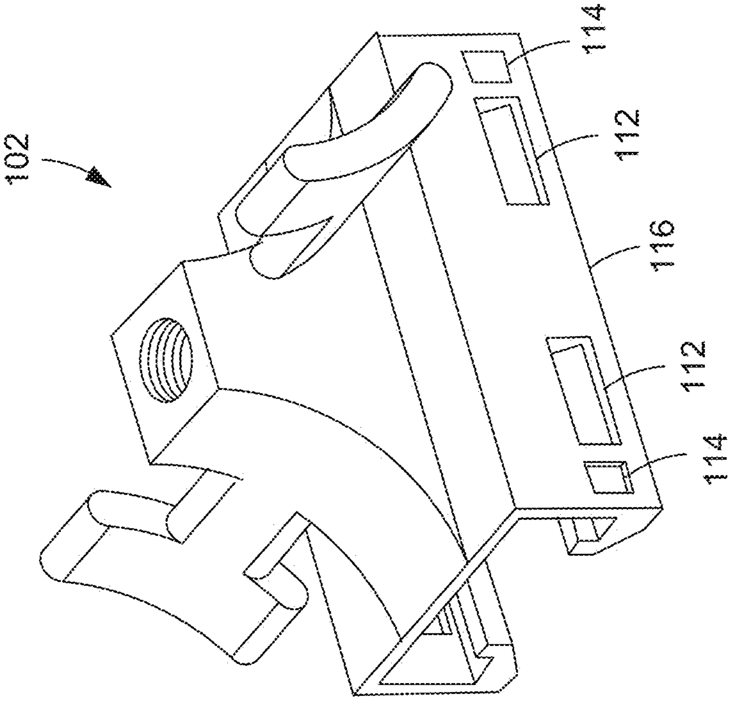
FIG. 33 shows an example of a snap-on base having locking clip openings and nub openings formed in the pair of bottom portion attachment arms of the snap-on base.
Figure 35:
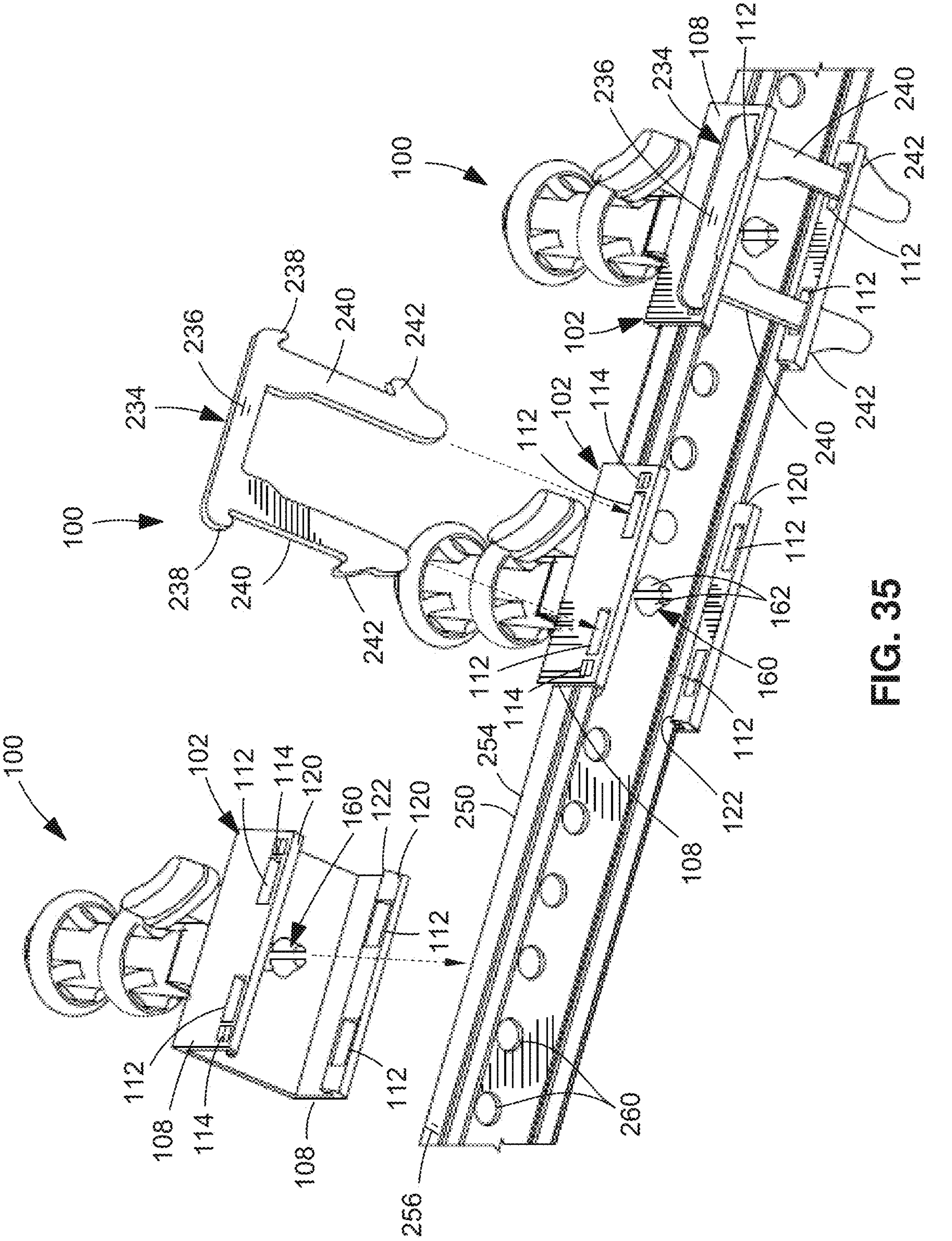
FIG. 35 is a bottom-up perspective view of an example of the installation of a snap-on support assembly on a spanner bar and illustrating the installation of locking clip into the snap-on base.

Referring to FIGS. 33-35, shown in FIG. 35 is an example of a snap-on support assembly 100 having a locking clip 234 for securing the snap-on base 102 to a bar member 250 such as a spanner bar 252. Although the above-described lateral flanges 120, vertical retaining strips 122, and/or retaining bosses 160 provide sufficient securement of the snap-on base 102 to the spanner bar 252, the locking clip 234 provides additional securement as may be desired when multiple and/or heavy elongate elements 270 are secured to the snap-on support assembly 100 and/or when the snap-on support assembly 100 is used in a high-vibration area and/or in an exposed area where the snap-on support assembly 100 is susceptible to being accidentally knocked off the spanner bar 252.

As shown in FIG. 35, the locking clip 234 is comprised of a clip bridge 236 interconnecting a spaced-apart pair of clip legs 240 defining a U shape of the locking clip 234. Each clip leg 240 has a hook portion 242 on a free end of the clip leg 240. The hook portions 242 are configured to prevent removal of the clip legs 240 from the locking clip openings 112 once installed. The locking clip 234 also has nub portions 238 on opposite sides of the clip bridge 236. The nub portions 238 are configured to be received within nub openings 114 located immediately adjacent to the locking clip openings 112. The locking clip 234 is preferably formed (e.g., molded) of a lightweight high-strength polymeric material such as Nylon™, although other materials such as metallic material may be used.

As shown in FIGS. 33-34, the snap-on base 102 has locking clip openings 112 formed along the snap-on edge portion 116 of each base portion attachment arm. In addition, the locking clip 234 has a nub opening 114 formed adjacent to each locking clip opening 112. Although shown having a rectangular shape, the locking clip openings 112 and the nub openings 114 may be provided in alternative shapes. The locking clip openings 112 are configured to receive the clip legs 240 of the locking clip 234 in a manner locking the snap-on base 102 to the bar member 250 as shown in FIG. 35. The nub openings 114 are configured to receive the nub portions 238 located on the locking clip 234.

FIG. 35 illustrates the process of attaching a snap-on base 102 on a spanner bar 252, and installing a locking clip 234 in the snap-on base 102. For example, the left-hand portion of FIG. 35 shows the snap-on support assembly 100 positioned above the spanner bar 252 in a manner such that the retaining boss 160 is aligned with the bar member hole 260 in the spanner bar 252. The center portion of FIG. 35 shows a snap-on base 102 snapped onto the bar member 250 in a one-step snap-on process in which the retaining boss 160 is received within the bar member hole 260, and each of the bar side walls 256 is surrounded by a bottom portion attachment arm 108, a vertical retaining strip 122, and a lateral flange 120 of the snap-on base 102. The clip legs 240 of the locking clip 234 are aligned with the locking clip openings 112 in the snap-on base 102 in preparation for installation of locking clip 234.

In the right-hand portion of FIG. 35, the clip legs 240 of the locking clip 234 have been inserted through the locking clip openings 112 in both of the bottom portion attachment arms 108. The nub portions 238 are received within the nub openings 114 formed in one of the bottom portion attachment arms 108. Although not shown in FIG. 35, the hook portion 242 on each clip leg 240 is engaged against an exterior side of the bottom portion attachment arm 108, thereby preventing unintentional removal of the locking clip 234 from the locking clip openings 112. The locking clip 234 can be removed from the snap-on base 102 by squeezing the clip legs 240 together in a manner enabling the hook portions 242 on the clip legs 240 to pass through the locking clip openings 112 in both of the bottom portion attachment arms 108.

Multiple snap-on support assemblies 100 can be installed at desired intervals along the spanner bar 252 using the above-described installation process. Once the snap-on support assemblies 100 are installed on the spanner bar 252, cable ties 278 or other flexible elements are used to secure one or more elongate elements 270 such as wires, cables 274, and tubing 276 to the one or more ring posts 172 of each ring post 172. For example, any number of hollow ring posts 182 and/or studded ring posts 186 can be assembled on top of a monument 142 or on top of a studded ring post 186 of a snap-on support assembly 100 as described above. Advantageously, the hollow ring posts 182 are provided in a single configuration, as are the studded ring posts 186, which avoids the cost and complexity associated with providing multiple configurations of co-molded ring posts (not shown) having different quantities of rings 176.

Figure 36:
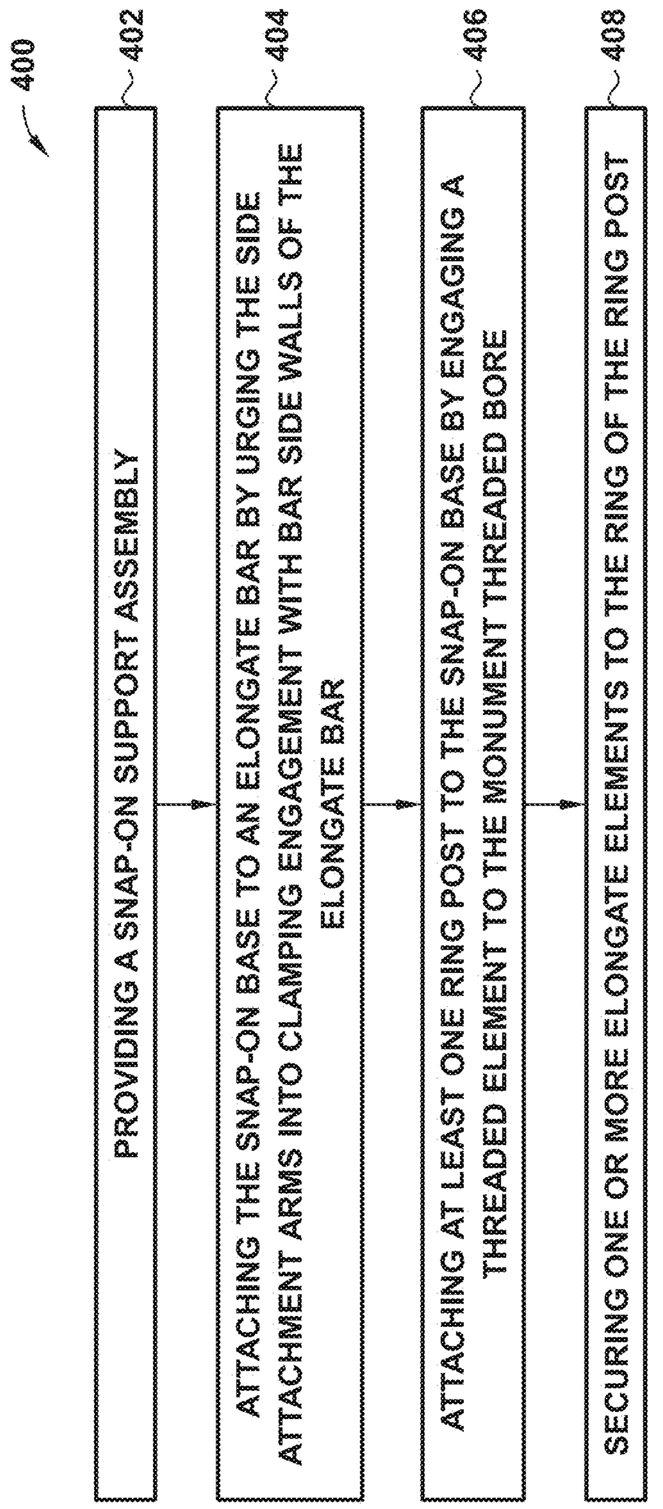
FIG. 36 is a flowchart of operations included in method of supporting one or more elongate bar members on a structure.

Referring to FIG. 36, shown is a flowchart of a method of supporting one or more elongate elements 270 on a bar member 250. Step 402 of the method includes providing a snap-on support assembly 100. As described above, the snap-on support assembly 100 comprises a snap-on base 102, including a base bottom portion 104 and a base top portion 140. The base bottom portion 104 is comprised of a spaced-apart pair of bottom portion attachment arms 108, and the base top portion 140 is comprised of a monument 142 which is co-molded with the base bottom portion 104. As described above, the monument 142 has a monument top end 144 having a monument threaded bore 146 having internal threads 150. In some examples, the monument threaded bore 146 is defined by a monument metal insert 148. The snap-on support assembly 100 further includes at least one ring post 172 having a ring 176 supported on a post 174. As described above, the ring 176 is a hollow ring post 182 or a studded ring post 186.

Step 404 of the method 400 includes attaching the snap-on base 102 to a bar member 250 such as a spanner bar 252. As mentioned above, the spanner bar 252 is typically mounted on a structure such as an aircraft 316. The process of attaching the snap-on base 102 to the spanner bar 252 is a one-step snap-on process in which the bottom portion attachment arms 108 are urged over the snapper bar until the bottom portion attachment arms 108 are in clamping engagement with the bar side walls 256 of the spanner bar 252.

As described above with regard to FIG. 35, step 404 of attaching the snap-on base 102 to the bar member 250 comprises urging the bottom portion attachment arms 108 onto the bar side walls 256 until the vertical retaining strip 122 on each bottom portion attachment arm 108 is clamped against a bottom side of one of the bar side walls 256 of the bar member 250. As shown in FIGS. 30-32, each vertical retaining strip 122 is formed along snap-on edge portion 116 of the bottom portion attachment arms 108.

In some examples, the process of attaching the snap-on base 102 to the bar member 250 further includes inserting at least one retaining boss 160 of the base bottom portion 104 into a bar member hole 260 in the bar web 254 of the bar member 250. As mentioned above, the snap-on base 102 can include at least one retaining boss 160 protruding from the bottom portion platform 106. A snap-on base 102 can include any number of retaining bosses 160 including a single retaining boss 160 (FIG. 35), two retaining bosses 160 (FIG. 32), three retaining bosses 160 (FIG. 30), or four or more retaining bosses 160 (not shown). As mentioned above, each retaining boss 160 is comprised of a spaced pair of boss portions 162 that, when squeezed together, can be inserted into a bar member hole 260, after which the boss portions 162 are released to their non-squeezed positions, thereby capturing the retaining boss 160 in the bar member hole 260. Advantageously, the one or more retaining bosses 160 prevent movement of the snap-on base 102 along the lengthwise direction of the bar member 250, and prevent vertical movement of the snap-on base 102 relative to the bar member 250. In addition, the one or more retaining bosses 160 align and further secure the snap-on base 102 to the bar member 250.

Referring to FIG. 35, the process of attaching the snap-on base 102 to the bar member 250 can often include inserting a locking clip 234 into locking clip openings 112 formed in the bottom portion attachment arms 108 of the snap-on base 102 in a manner locking the snap-on support assembly 100 to the bar member 250. As described above, each of the clip legs 240 of the locking clip 234 has a hook portion 242 configured to prevent removal of the clip leg 240 from the locking clip opening 112 once inserted in the locking clip openings 112. Alternatively or additionally, the locking clip 234 can include nub portions 238 on opposite sides of the clip bridge 236. The nub portions 238 are received within small nub openings 114 located immediately adjacent to the larger locking clip openings 112 formed in the bar side wall 256.

Step 406 of the method includes attaching at least one ring post 172 to the snap-on base 102 by engaging a threaded element 200 to the monument threaded bore 146. Step 406 can be performed before or after mounting a snap-on base 102 on a bar member 250 such as a spanner bar 252. As mentioned above, a snap-on support assembly 100 can include one or more ring posts 172, which can be hollow ring posts 182 (FIGS. 7-9) and/or studded ring posts 186 (FIGS. 16-19).

To attach a hollow ring post 182 to a snap-on base 102, step 406 comprises inserting a fastener 202 (e.g., a bolt, screw, etc.) into one or more ring post through-hole 184 respectively of one or more hollow ring post 182, and threadably engaging the fastener 202 to the monument threaded bore 146 (e.g., monument metal insert 148). The fastener head 204 is located on the ring post top end 188 and the threaded portion 208 of the faster is engaged to the internal threads 150 of the monument top end 144. As shown in FIGS. 1-2 and 10-13, any number of hollow ring posts 182 can be stacked on top of each other and secured to a snap-on base 102 via a fastener 202.

To attach a studded ring post 186 to a snap-on base 102, step 406 comprises engaging the threaded stud 196 of the studded ring post 186 to the monument threaded bore 146 (e.g., monument metal insert 148). As described above, the ring post top end 188 of each studded ring post 186 has a ring post metal insert 190 defining a ring post threaded bore 192. The ring post threaded bore 192 is configured to receive another threaded element 200 such as the threaded stud 196 of another studded ring post 186. In this arrangement, one or more additional studded ring posts 186 can be stacked on top of each other. Alternatively, any number of hollow ring posts 182 can be stacked on top of a studded ring post 186 and secured to the studded ring post 186 via a faster inserted through the ring post through-holes 184 of the hollow ring posts 182 and engaged to the ring post metal insert 190 of the studded ring post 186.

As described above, step 406 of attaching the ring post 172 to the snap-on base 102 comprises attaching a ring post stack 170 containing two or more ring posts 172 to the snap-on base 102 by engaging the threaded element 200 to the monument threaded bore 146. In one example, a ring post stack 170 can include only hollow ring posts 182 secured to the snap-on base 102 via a fastener 202 (e.g., a bolt). In another example, a ring post stack 170 can include a studded ring post 186 threadably engaged to the snap-on base 102, and one or more additional studded ring posts 186 stacked on top of the ring post 172 that is directly attached to the snap-on base 102. In yet another example, a ring post stack 170 can include a studded ring post 186 threadably engaged to the snap-on base 102, and one or more hollow ring posts 182 stacked on top of the studded ring post 186 and secured via a faster that extends into the ring post metal insert 190.

In some examples, the method 400 includes installing a spacer 222 between the snap-on base 102 and the one or more ring posts 172. For example, FIGS. 27-28 show the installation of a tubular spacer 222 between the monument top end 144 of the snap-on base 102 and the bottom-most ring post 172 of the ring post stack 170. The spacer 222 is installed during the process of fastening the one or more ring posts 172 to the snap-on base 102. As mentioned above, the spacer 222 provides additional clearance between the snap-on base 102 and elongate elements 270 secured to the bottom ring post 172.

Step 408 of the method 400 includes securing one or more elongate elements 270 to at least one of the rings 176 of the one or more ring post 172 included with snap-on support assembly 100. To secure an elongate element 270 such as a wire harness 272 to a ring 176 of the ring post 172, step 408 includes inserting the free end of a flexible element such as a cable tie 278 into one or more slots 180 of a ring 176, and then looping the cable tie 278 back onto itself and inserting the free end into a buckle 280 of the cable tie 278 and cinching the cable tie 278 around the elongate element 270.

In some examples, step 408 can include supporting an elongate element 270 on a curved support element 124 protruding from the monument 142 of the snap-on base 102. For example, FIG. 29 shows a cable tie 278 looped around the support arm 128 of a curved support element 124 and securing a tubing 276 to the snap-on base 102. As may be appreciated, any one of a variety of alternative types of elongate elements 270 can be secured to one or more of the curved support elements 124 of the snap-on base 102.

Some examples of the method 400 additionally include mounting an apparatus 220 such as a p-clamp 224 on top of the topmost ring post 172 of a snap-on support assembly 100, and securing an elongate element 270 to the p-clamp 224. For example, FIG. 24, shows a p-clamp band assembly 228 mounted on top of the ring post stack 170 and secured via the same fastener 202 that secures the ring post stack 170 to the snap-on base 102. FIGS. 25-26 show an example of a snap-on support assembly 100 mounted on top of the ring post stack 170. As shown in FIG. 26 and described above, the p-clamp-stud assembly 226 includes a threaded stud 196 extending from the p-clamp body 230 and configured to threadably engage the ring post metal insert 190 in the topmost ring post 172 of the ring post stack 170. The p-clamp band assembly 228 and the p-clamp stud assembly 226 can be used to secure any one of a variety of different types of elongate elements 270 including, but not limited to, wires, wire harnesses 272, cables 274, tubing 276, and other elongate elements 270.

Figure 16:
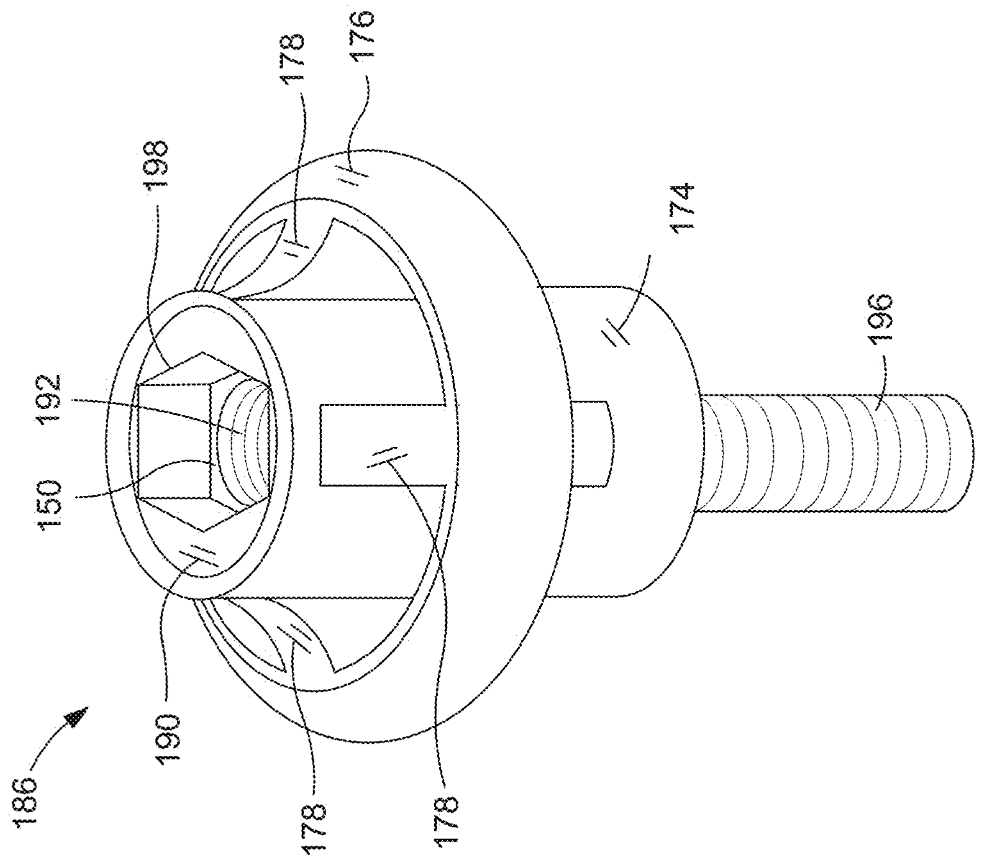
FIG. 16 is a top-down perspective view of an example of a studded ring post having a threaded stud extending downwardly from the ring post bottom end.
Figure 19:
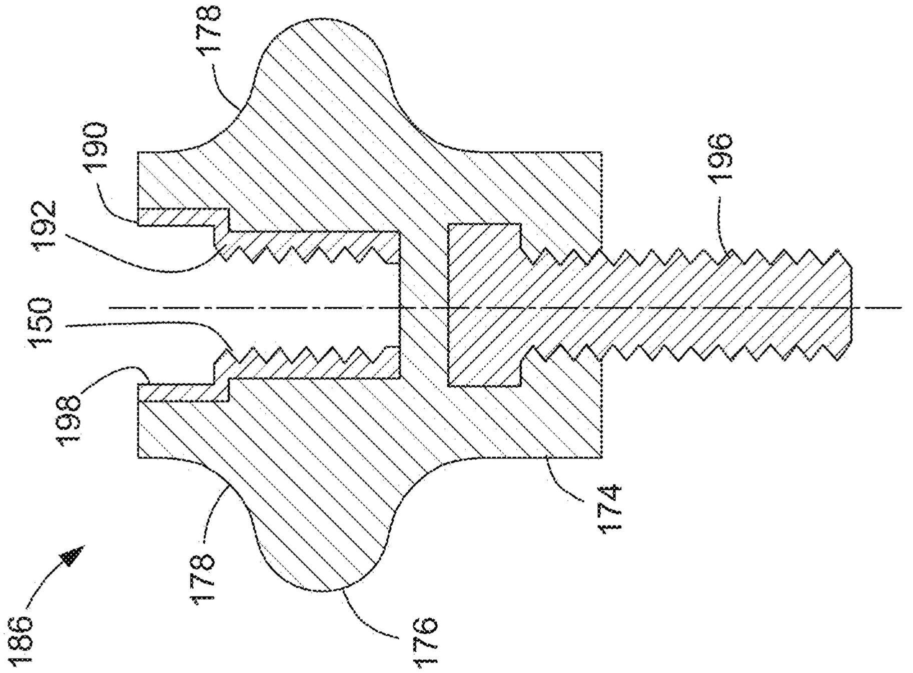
FIG. 19 is a sectional view of the studded ring post of FIGS. 16-18, and illustrating a ring post metal insert and a threaded stud embedded in the studded ring post.
Figure 18:
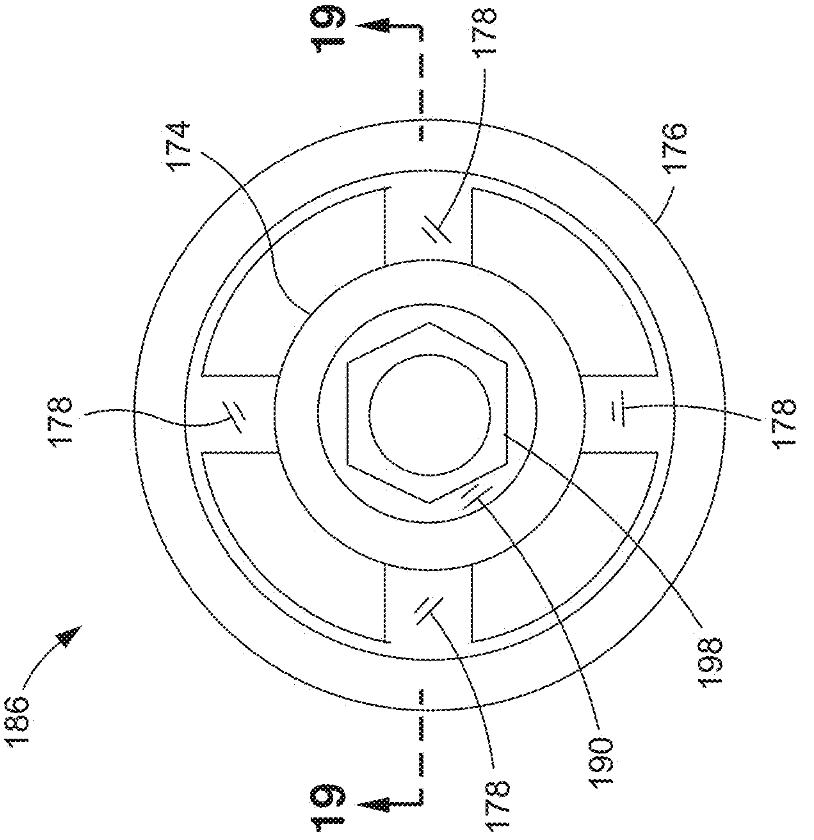
FIG. 18 is a top-down view of the studded ring post of FIGS. 16-17.

Referring to FIG. 16, shown is an example of an aircraft 316 incorporating the presently-disclosed snap-on support assembly 100 and/or the support system 130 comprised of the combination of at least one snap-on support assembly 100 and a bar member 250 to which the snap-on support assembly 100 is mounted. The aircraft 316 includes a fuselage 318 having a nose 320 and an empennage 322. The empennage 322 includes a horizontal tail 324 and a vertical tail 326. The aircraft 316 includes a pair of wings 330 extending from the fuselage 318. The aircraft 316 can include any number of snap-on support assemblies 100 for supporting elongate elements 270 within the aircraft 316. The snap-on support assemblies 100 can support any one of a variety of different types of elongate elements 270 including, but not limited to tubing 276, hoses, conduits, wires, wire harnesses 272, and cables 274 such as electrical cables, network cables, data bus cables, fiber optic cables, high speed transmission cables, and coaxial cables. Although described in the context of an aircraft 316, the snap-on support assemblies 100 can be implemented for supporting elongate elements 270 on any one of a variety different types of structures including vehicles such as aircraft, watercraft, spacecraft, and land-based vehicles, and any one of a variety of different types of stationary objects such buildings, architectural structures, and other stationary or non-vehicular structures.

Figure 39:
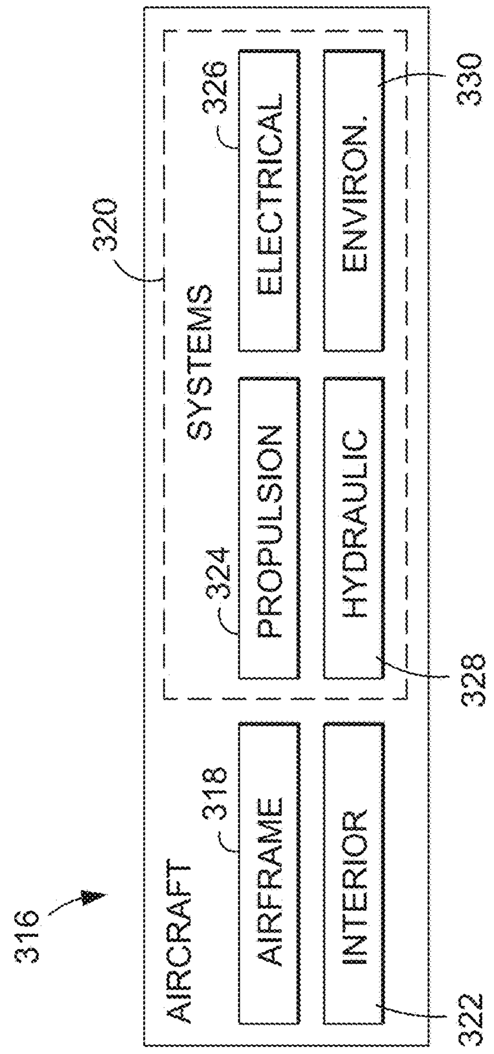
FIG. 39 is an illustration of an exemplary block diagram of an aircraft.
Figure 38:
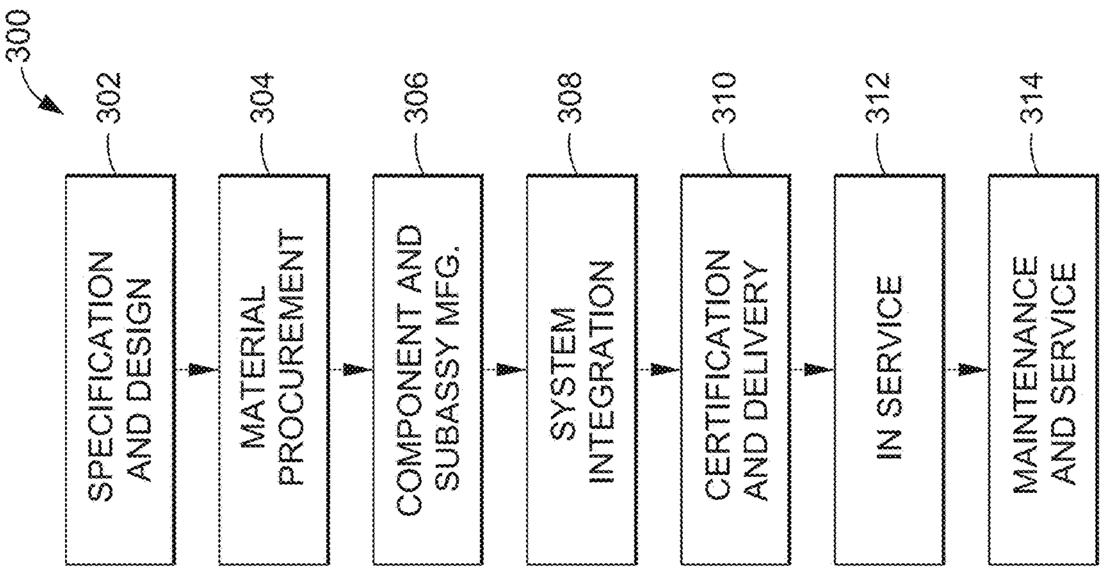
FIG. 38 is an illustration of a flow diagram of an exemplary aircraft manufacturing and service method.

Referring to FIGS. 38-39, embodiments of the disclosure may be described in the context of an aircraft manufacturing and service method 300 as shown in FIG. 38 and an aircraft 316 as shown in FIG. 39. During pre-production, exemplary method 300 may include specification and design 302 of the aircraft 316 and material procurement 304. During production, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 is scheduled for routine maintenance and service 314, which may also include modification, reconfiguration, refurbishment, and so on.

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 39, the aircraft 316 produced by exemplary method may include an airframe 332 with a plurality of systems and an interior 334. Examples of high-level systems include one or more of a propulsion system 338, an electrical system 340, a hydraulic system 342, and an environmental system 344. Any number of other systems may be included. Although an aerospace example is shown, the principles of the invention may be applied to other industries, such as the automotive industry.

Apparatuses and methods embodied herein may be employed during any one or more of the stages of the production and service method 300. For example, components or subassemblies corresponding to production process may be fabricated or manufactured in a manner similar to components or subassemblies produced while the aircraft 316 is in service. Also, one or more apparatus embodiments, method embodiments, or a combination thereof may be utilized during the production stages and, for example, by substantially expediting assembly of or reducing the cost of an aircraft 316. Similarly, one or more of apparatus embodiments, method embodiments, or a combination thereof may be utilized while the aircraft 316 is in service, for example and without limitation, to maintenance and service 314.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A snap-on support assembly, comprising:
a snap-on base, including:
a base bottom portion comprising a spaced-apart pair of bottom portion attachment arms configured for snap-on attachment to a bar member;
a base top portion comprising a monument co-molded with the base bottom portion and having a monument top end having a monument threaded bore; and
at least one ring post having a single ring for securing one or more elongate elements to the ring post, and the ring post is configured to be attached to the monument top end via a threaded element engaging the monument threaded bore.

2. The snap-on support assembly of claim 1, wherein:
the ring post is a hollow ring post having a ring post through-hole; and
the threaded element is a fastener having a fastener shaft configured to extend through the ring post through-hole and threadably engage the monument threaded bore.

3. The snap-on support assembly of claim 1, wherein:
the ring post is a studded ring post having a ring post bottom end and a ring post top end;
the ring post bottom end has a threaded stud extending downwardly from the ring post and configured to threadably engage the monument threaded bore; and
the ring post top end has a ring post threaded bore configured to receive another threaded element.

4. The snap-on support assembly of claim 1, wherein:
the at least one ring post comprises two or more ring posts stackable on top of each other to form a ring post stack.

5. The snap-on support assembly of claim 1, wherein:
the monument has a monument metal insert embedded in the monument top end, and the monument metal insert has internal threads that define the monument threaded bore.

6. The snap-on support assembly of claim 1, further comprising:
a spacer configured to be installed between the monument top end and the ring post.

7. The snap-on support assembly of claim 1, further comprising:
a p-clamp configured to be mounted on a top of the ring post via a threaded element.

8. The snap-on support assembly of claim 1, wherein the base bottom portion comprises:
a vertical retaining strip formed on each of the bottom portion attachment arms and configured to clamp against bottom ends of the bar member.

9. The snap-on support assembly of claim 1, wherein the base bottom portion comprises:
a retaining boss protruding from an interior surface of the base bottom portion and configured to engage with a bar member hole in a bar web of the bar member.

10. The snap-on support assembly of claim 1, further comprising:

a locking clip having a spaced-apart pair of clip legs; and wherein each of the bottom portion attachment arms has locking clip openings sized and configured to receive the clip legs in a manner locking the snap-on base to the bar member.

11. A support system for supporting one or more elongate elements, comprising:

a bar member coupled to a structure;

one or more snap-on support assemblies mounted on the bar member, each snap-on support assembly comprising:

a snap-on base, including:

a base bottom portion comprising a spaced-apart pair of bottom portion attachment arms clamped onto the bar member;

a base top portion comprising a monument co-molded with the base bottom portion and having a monument top end having a monument threaded bore; and at least one ring post having a single ring for securing one or more elongate elements to the ring post, and the ring post is attached to the monument top end via a threaded element engaging the monument threaded bore.

12. A method of supporting one or more elongate elements on a bar member, comprising:

providing a snap-on support assembly, comprising:

a snap-on base, including:

a base bottom portion comprising a spaced-apart pair of bottom portion attachment arms;

a base top portion comprising a monument co-molded with the base bottom portion and having a monument top end having a monument threaded bore;

at least one ring post having a ring;

attaching the snap-on base to a bar member by urging the bottom portion attachment arms into clamping engagement with bar side walls of the bar member;

attaching at least one ring post to the snap-on base by engaging a threaded element to the monument threaded bore; and securing one or more elongate elements to the ring of the ring post.

13. The method of claim 12, wherein attaching at least one ring post to the snap-on base comprises:

inserting a fastener into a ring post through-hole of at least one hollow ring post, and threadably engaging the fastener to the monument threaded bore.

14. The method of claim 12, wherein attaching the ring post to the snap-on base comprises:

engaging a threaded stud of a studded ring post to the monument threaded bore.

15. The method of claim 12, wherein attaching the ring post to the snap-on base comprises:

attaching a ring post stack containing two or more ring posts to the snap-on base by engaging the threaded element to the monument threaded bore.

16. The method of claim 12, wherein engaging the threaded element to the monument threaded bore comprises:

engaging the threaded element to internal threads of a monument metal insert embedded in the monument top end.

17. The method of claim 12, further comprising:

installing a spacer between the monument top end and the ring post.

18. The method of claim 12, further comprising:

mounting a p-clamp on a top end of the ring post; and securing an elongate element to the p-clamp.

19. The method of claim 12, wherein attaching the snap-on base to the bar member comprises:

urging the bottom portion attachment arms onto the bar side walls until a vertical retaining strip on each bottom portion attachment arm clamps against a bottom side of one of the bar side walls of the bar member.

20. The method of claim 12, wherein attaching the snap-on base to the bar member comprises:

inserting a retaining boss of the base bottom portion into a bar member hole formed in a bar web of the bar member.

* * * * *